United States Patent
Colley

(10) Patent No.: US 12,179,904 B2
(45) Date of Patent: Dec. 31, 2024

(54) COMPLIANT ROOT STRUCTURE FOR CONNECTING AN AIRFOIL TO A FUSELAGE

(71) Applicant: John Christian Colley, Trafford, PA (US)

(72) Inventor: John Christian Colley, Trafford, PA (US)

( * ) Notice: Subject to any disclaimer, the term of this patent is extended or adjusted under 35 U.S.C. 154(b) by 122 days.

(21) Appl. No.: 17/690,081

(22) Filed: Mar. 9, 2022

(65) Prior Publication Data

US 2023/0286638 A1   Sep. 14, 2023

(51) Int. Cl.
*B64C 1/26* (2006.01)

(52) U.S. Cl.
CPC ..................... *B64C 1/26* (2013.01)

(58) Field of Classification Search
CPC ............... B64C 1/26; B64C 3/38; B64C 3/42
See application file for complete search history.

(56) References Cited

U.S. PATENT DOCUMENTS

| | | | | |
|---|---|---|---|---|
| 2,074,099 | A * | 3/1937 | Adams .................. | B64C 3/00 244/119 |
| 2,186,558 | A * | 1/1940 | Rouanet ................ | B64C 1/26 244/38 |
| 2,768,800 | A * | 10/1956 | Metzler ................ | B64C 3/42 244/38 |
| 8,246,302 | B2 | 8/2012 | Bertolotti | |
| 9,399,508 | B2 | 7/2016 | Lakic et al. | |
| 10,106,240 | B2 * | 10/2018 | Lakic .................... | B64C 1/26 |
| 2015/0097076 | A1 * | 4/2015 | Lakic .................... | B64C 3/38 244/46 |
| 2019/0291849 | A1 * | 9/2019 | Kierbel ................. | B64C 5/02 |

FOREIGN PATENT DOCUMENTS

| | | | |
|---|---|---|---|
| DE | 483040 C | 9/1929 | |
| DE | 19522507 A1 * | 7/1996 | ............... B64C 1/26 |
| FR | 421352 A | 2/1911 | |

\* cited by examiner

*Primary Examiner* — Christopher D Hutchens
*Assistant Examiner* — Michael A. Fabula
(74) *Attorney, Agent, or Firm* — Westman, Champlin & Koehler, P.A.

(57) ABSTRACT

A compliant root structure for connecting an airfoil to a fuselage structure capable of dampening the dynamic response of the fuselage structure when the airfoil encounters abrupt aerodynamic loads due to a turbulent atmosphere. The compliant root structure includes a connecting arm(s) that pivotally connects the airfoil to the fuselage structure so that the airfoil can displace relative to the fuselage structure in the direction relatively perpendicular to the spanwise and chordwise axes of the airfoil. A restoring force can be provided by the compliant root structure (for example, by spring means) to the airfoil when it is displaced relative to the fuselage. In some embodiments, the connecting arms can exhibit relatively high flexibility, and can be adapted to interconnect the airfoil and the fuselage by means of rigid joints. The flexibility of these connecting arms may eliminate the need for a separate spring means.

21 Claims, 18 Drawing Sheets

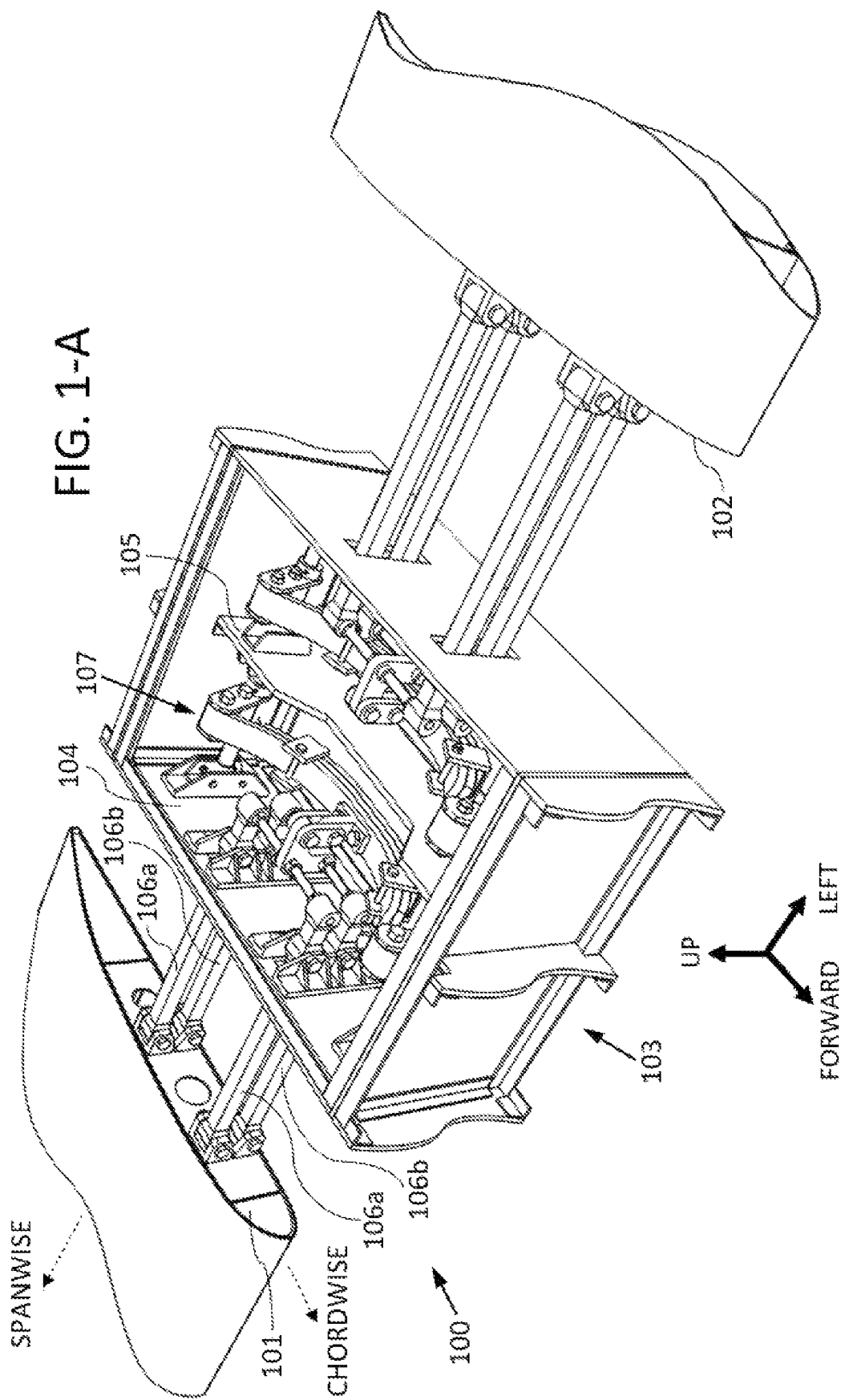

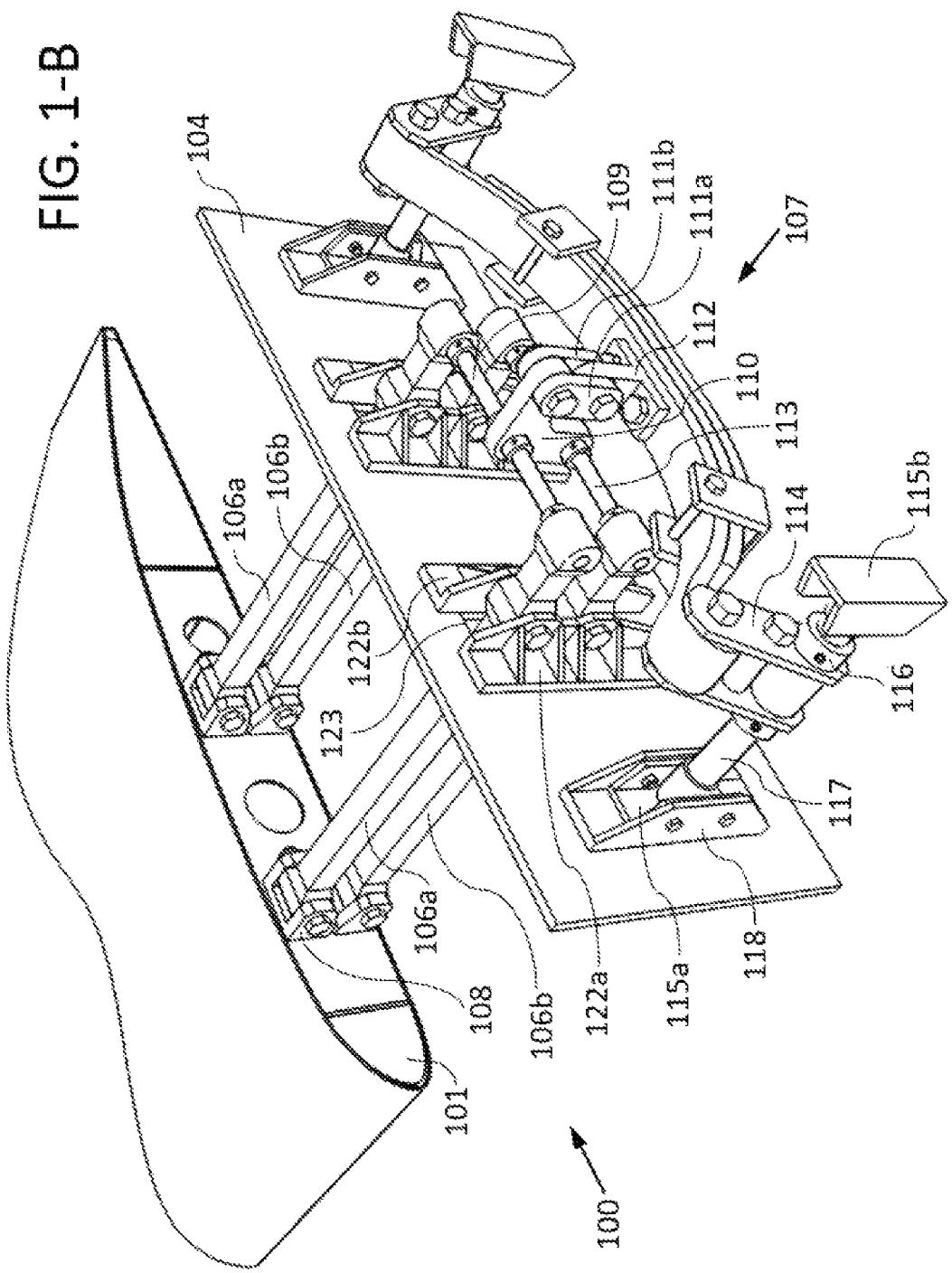
FIG. 1-B

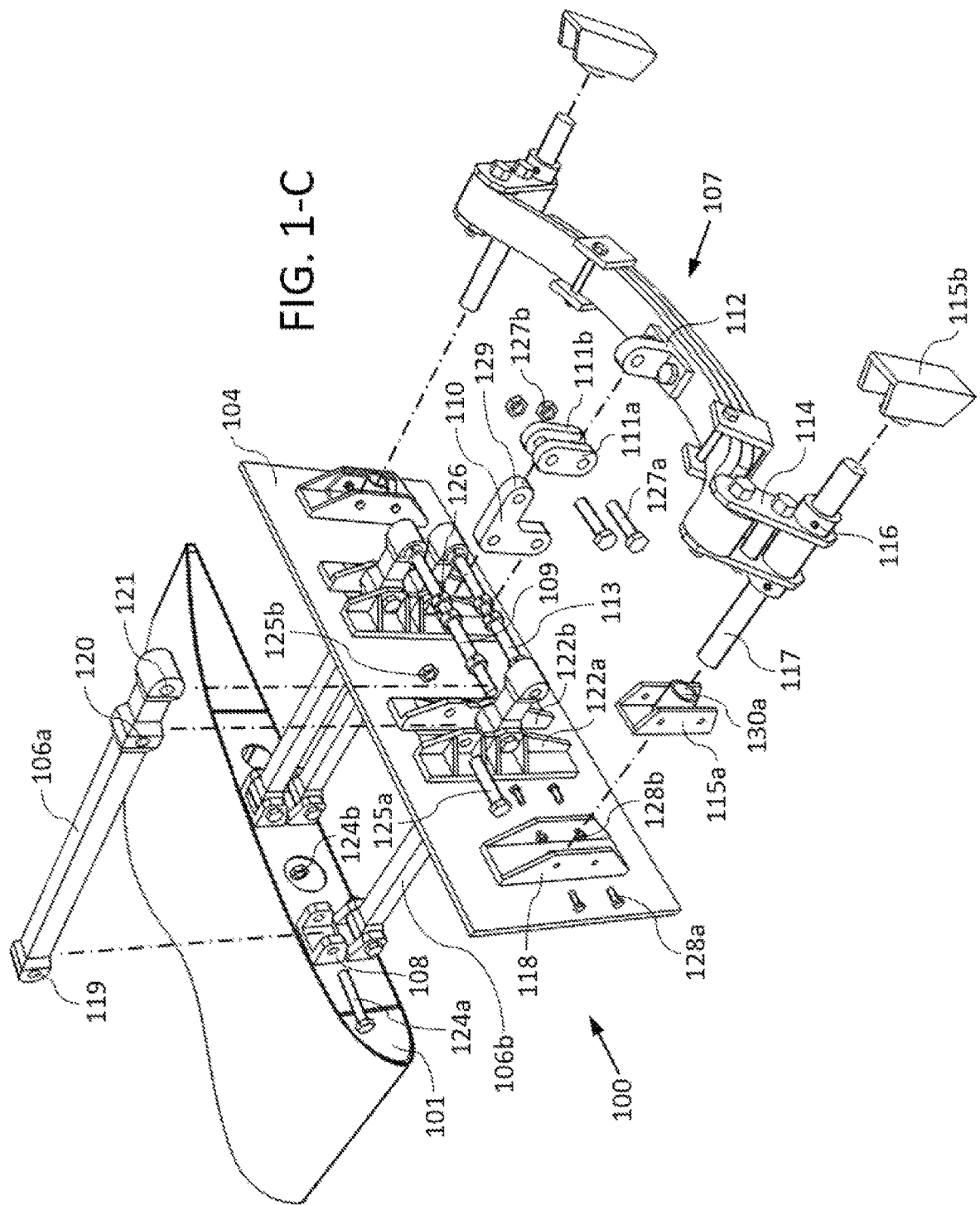
FIG. 1-C

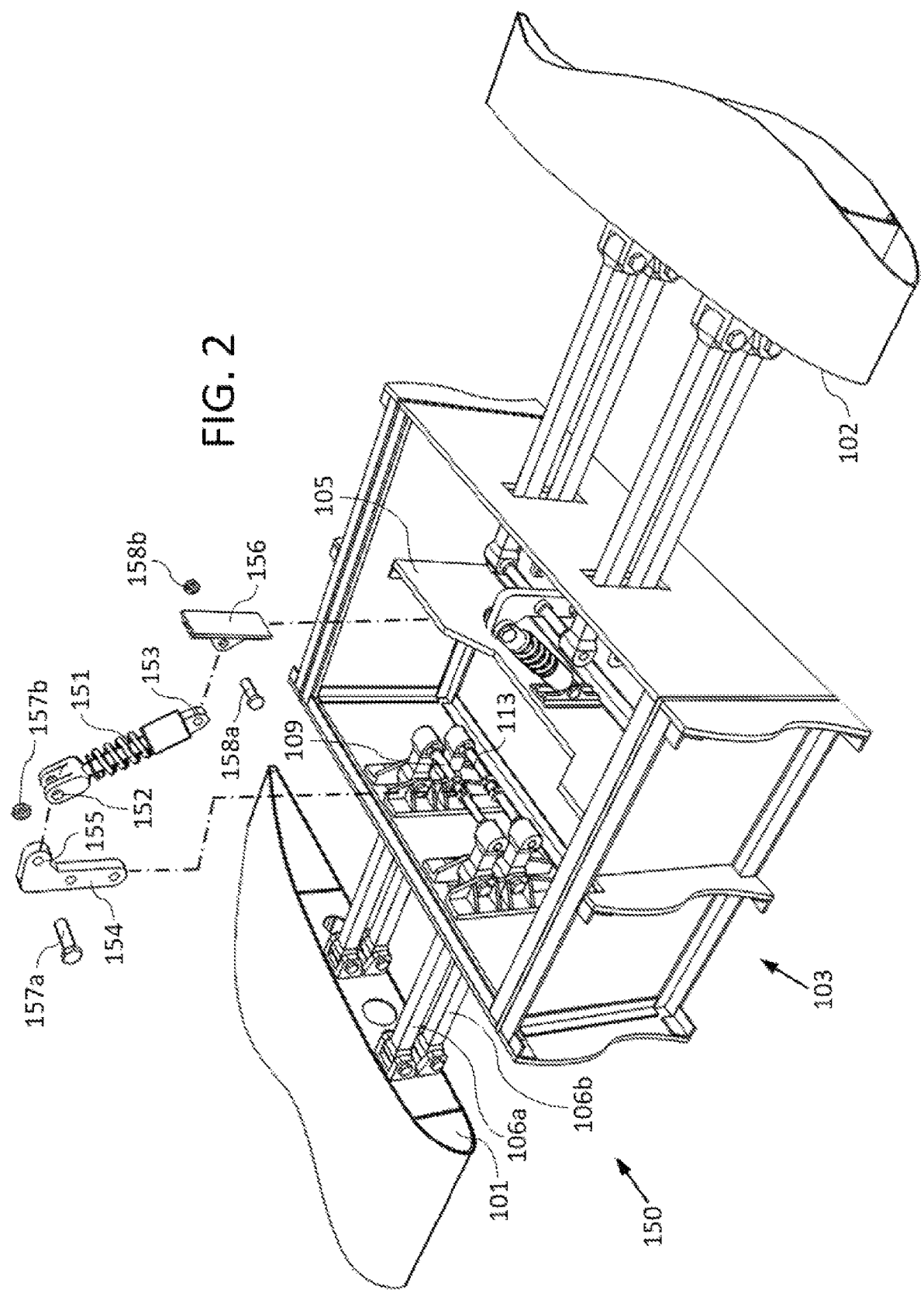

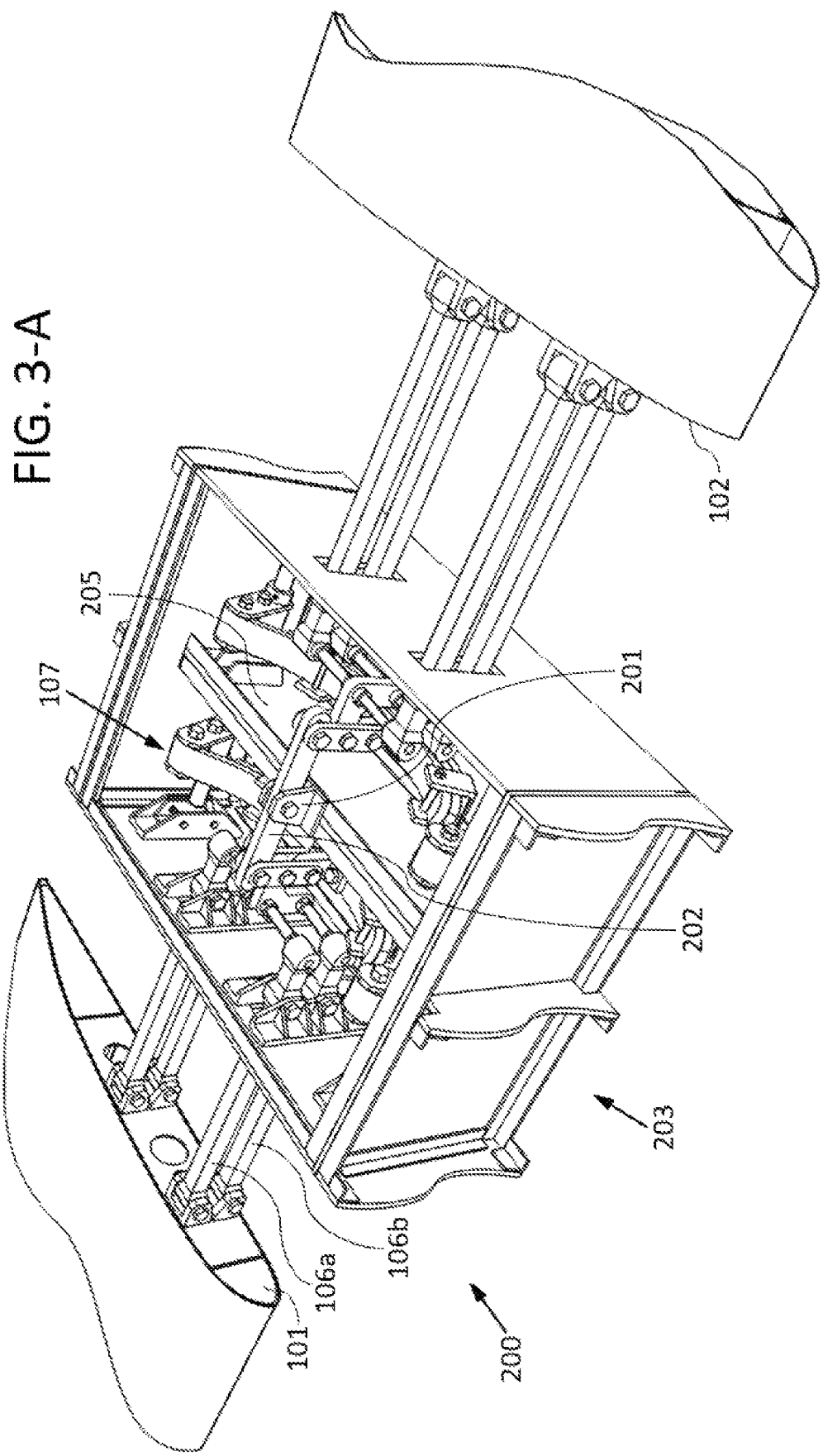
FIG. 3-A

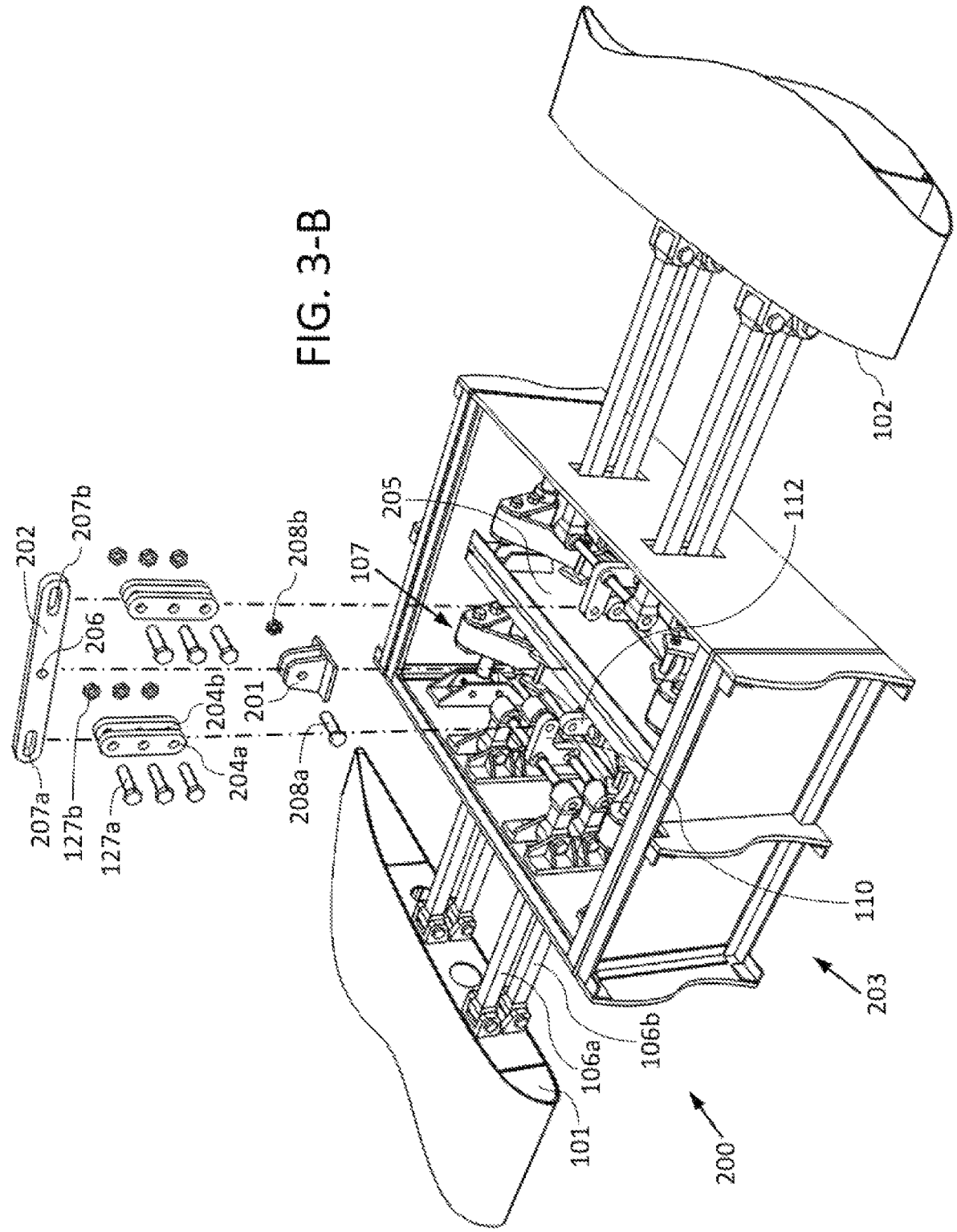

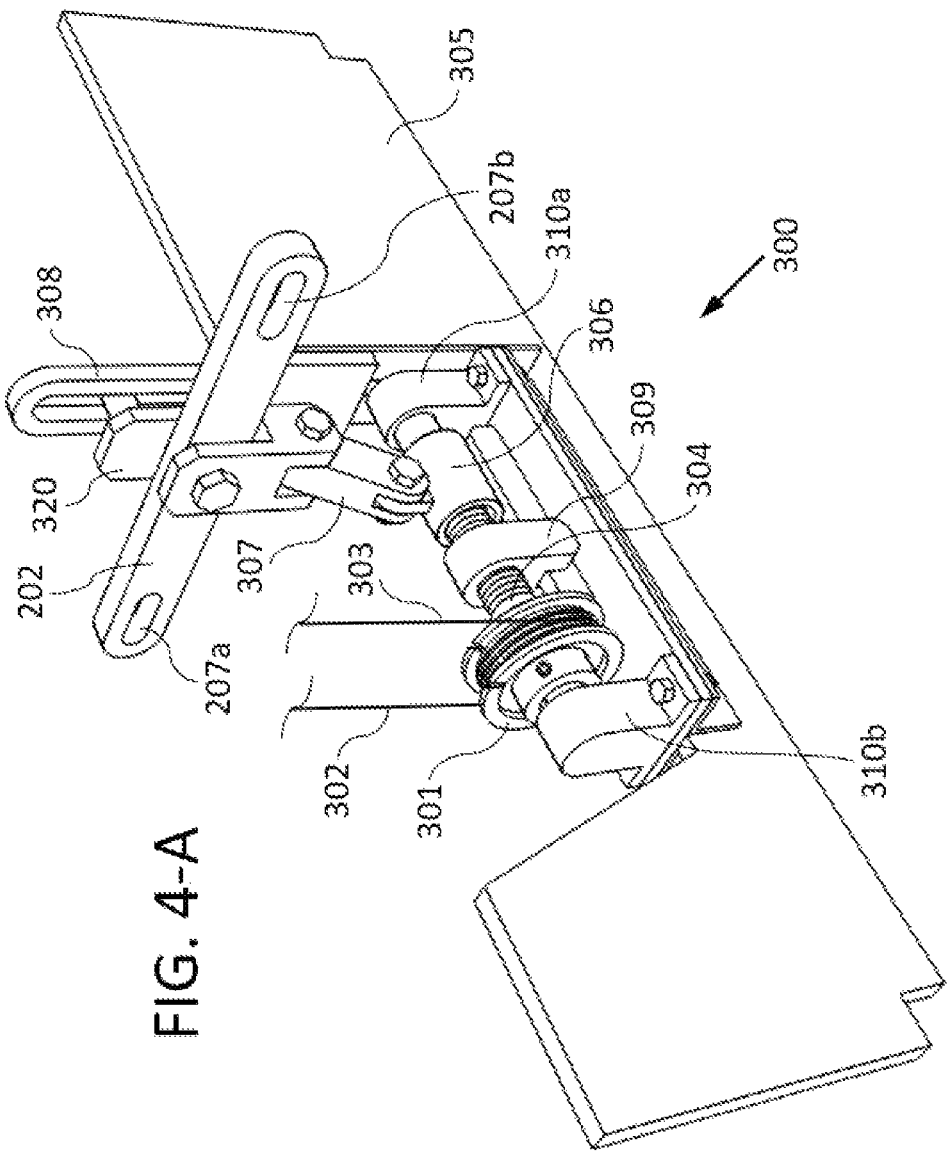
FIG. 4-A

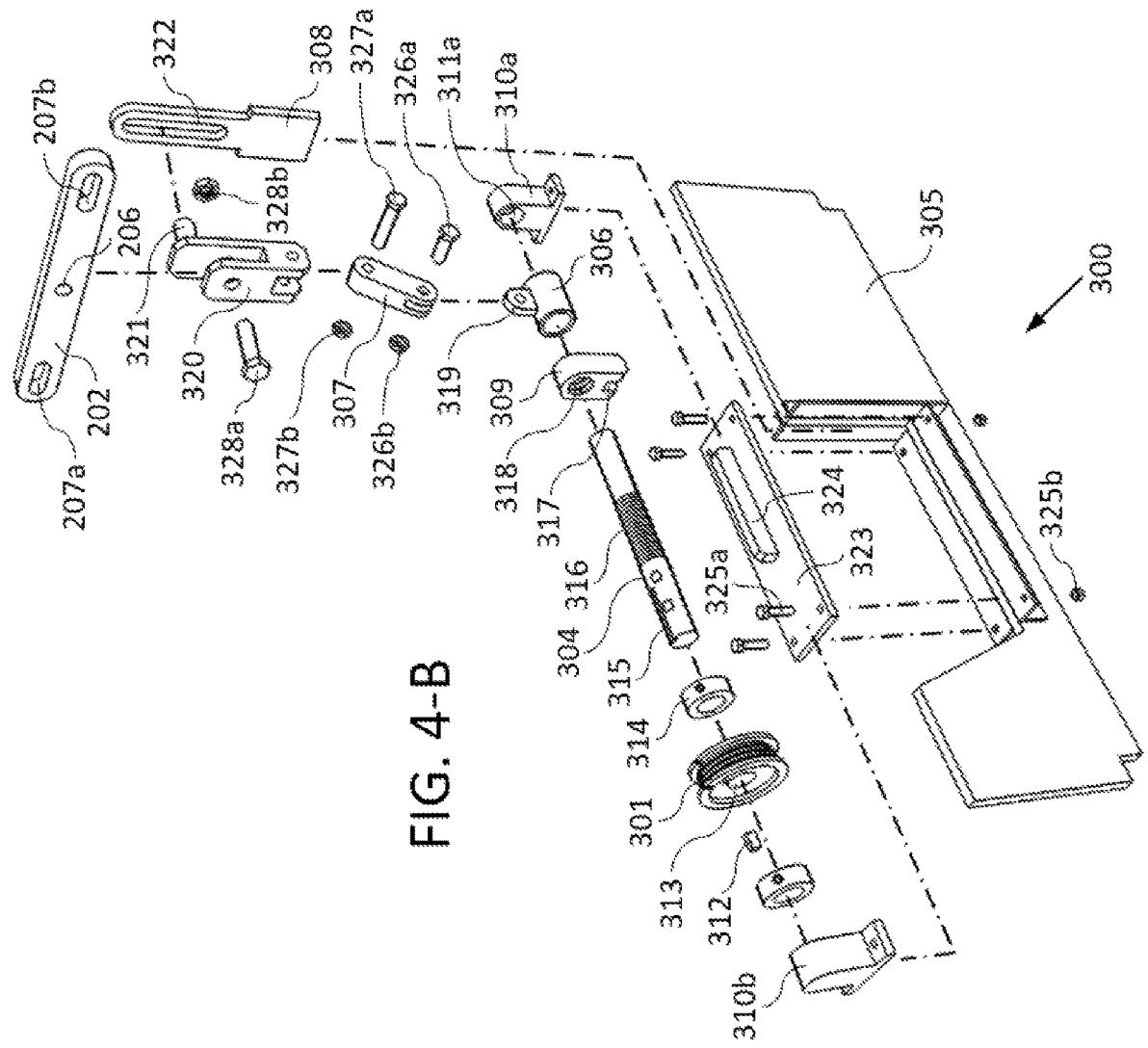
FIG. 4-B

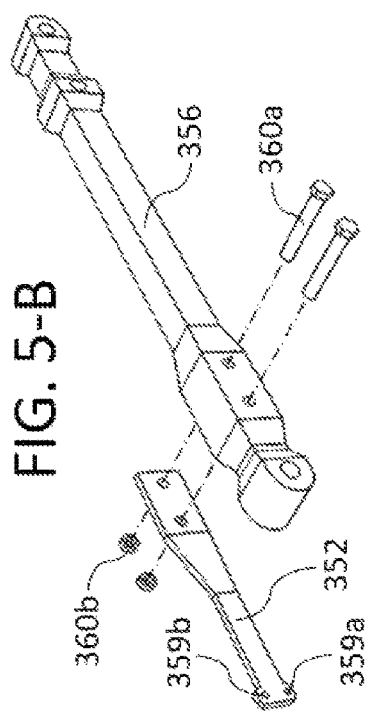
FIG. 5-B
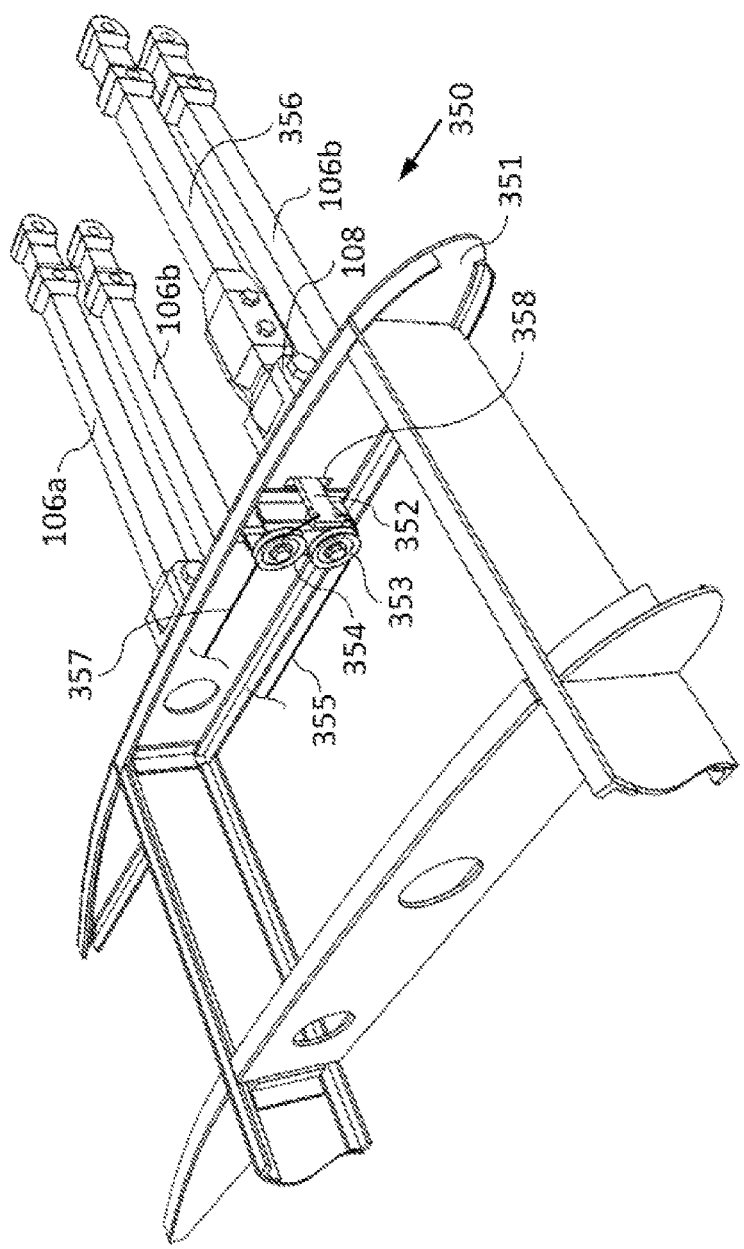
FIG. 5-A

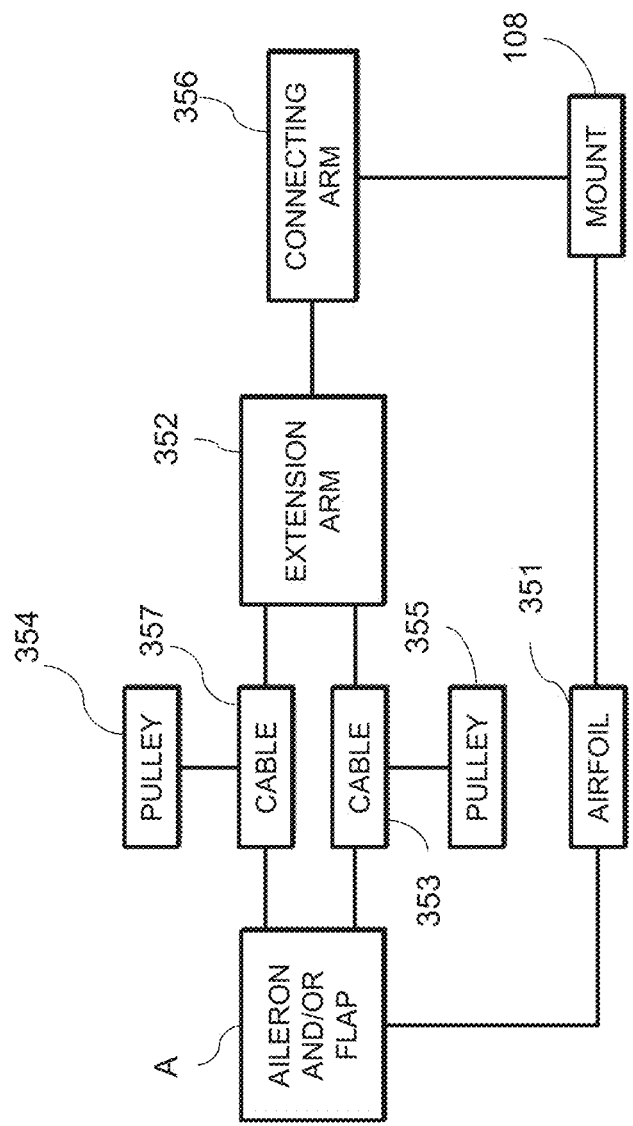
FIG. 5-C

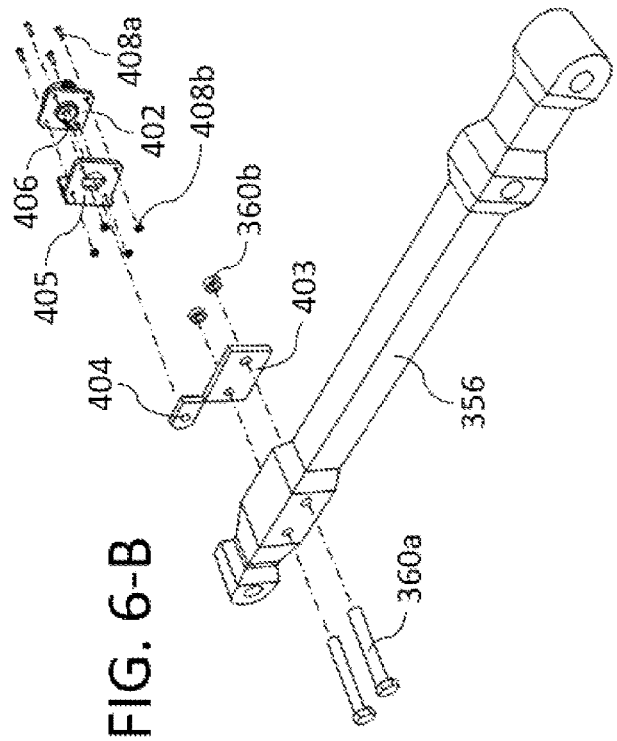
FIG. 6-B
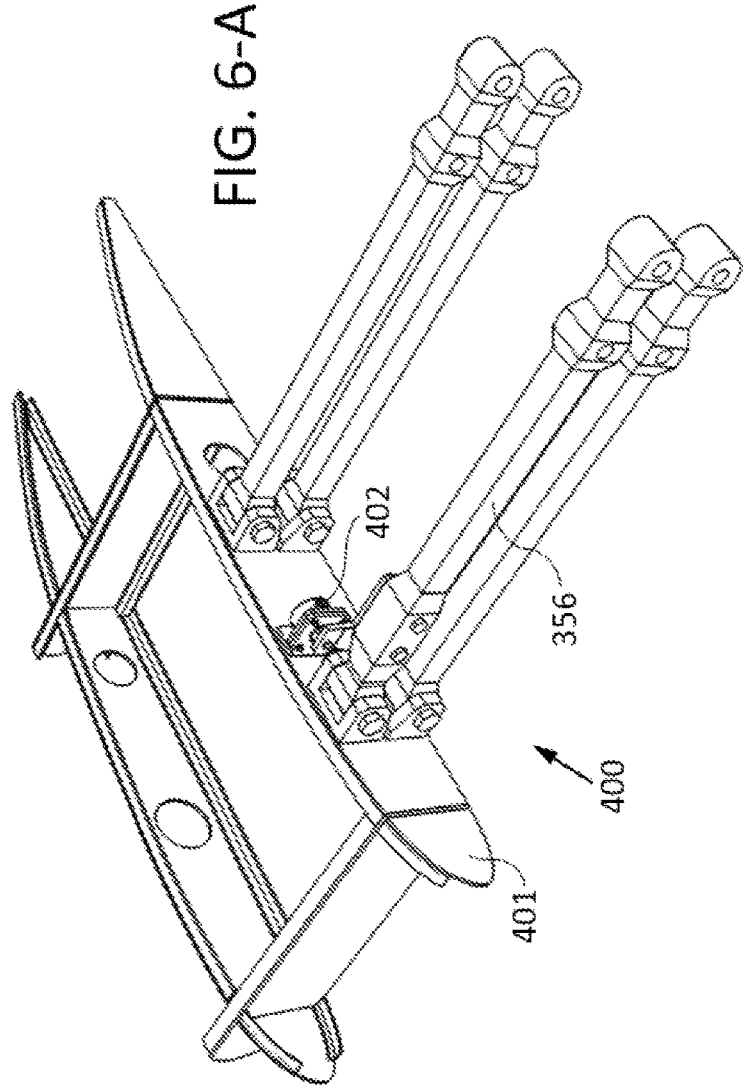
FIG. 6-A

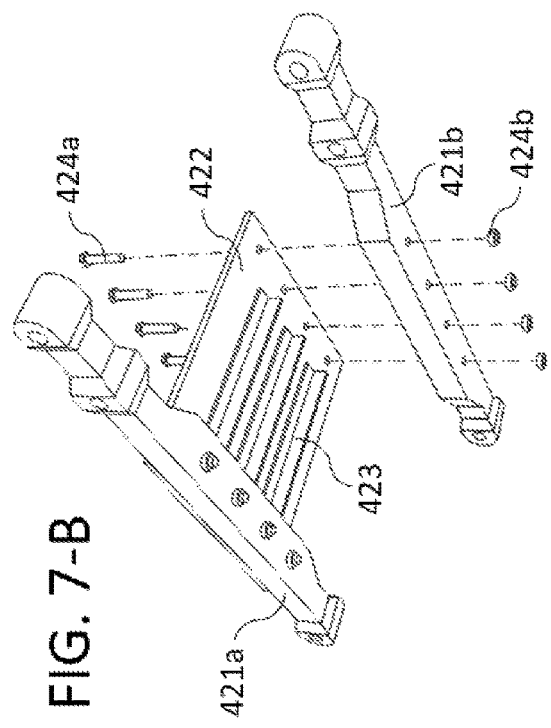
FIG. 7-B
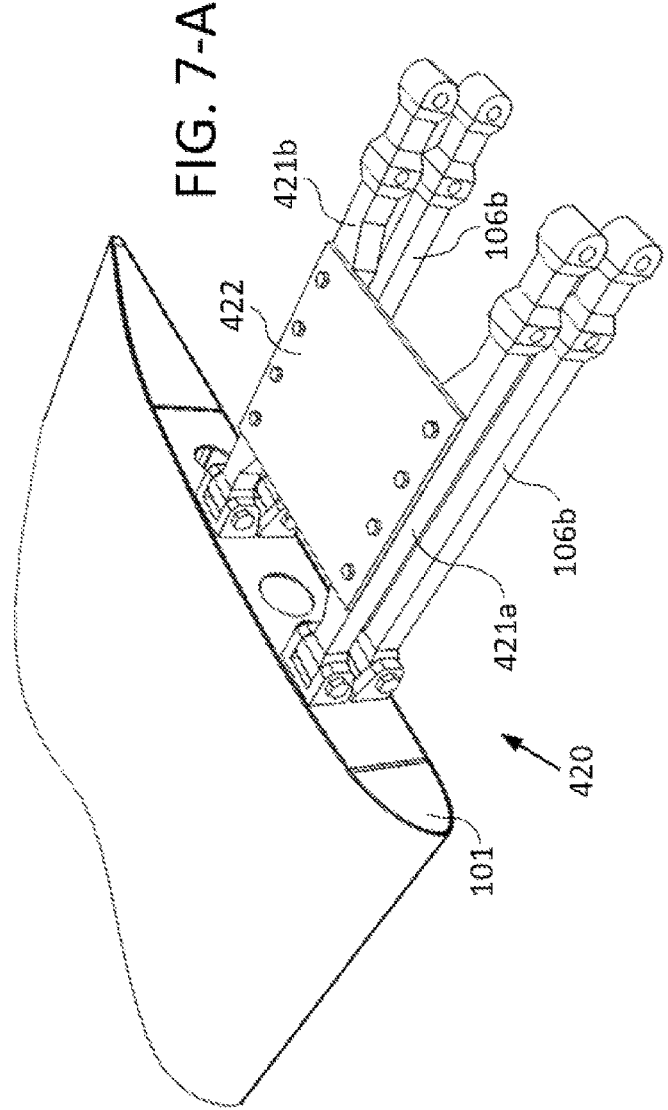
FIG. 7-A

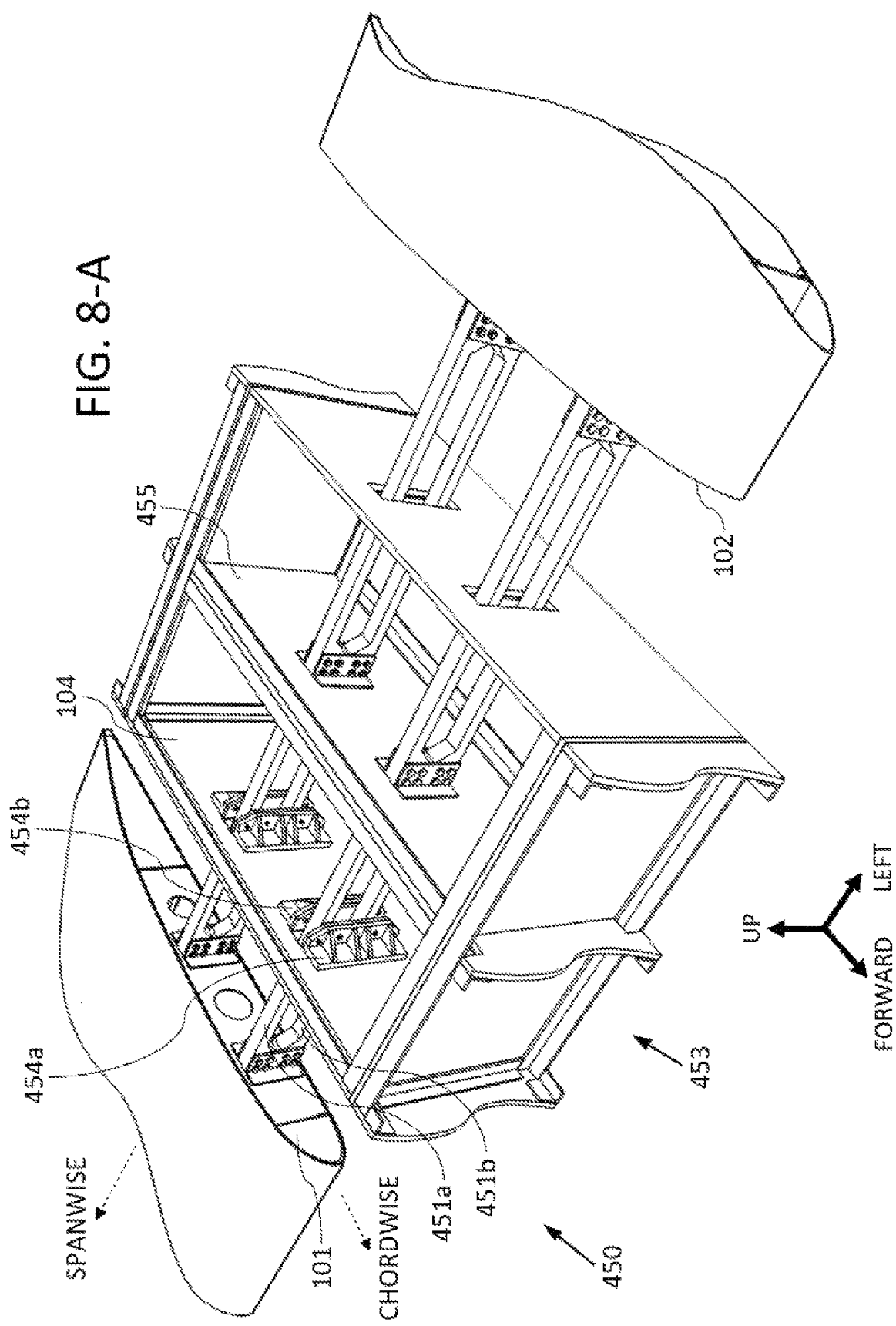

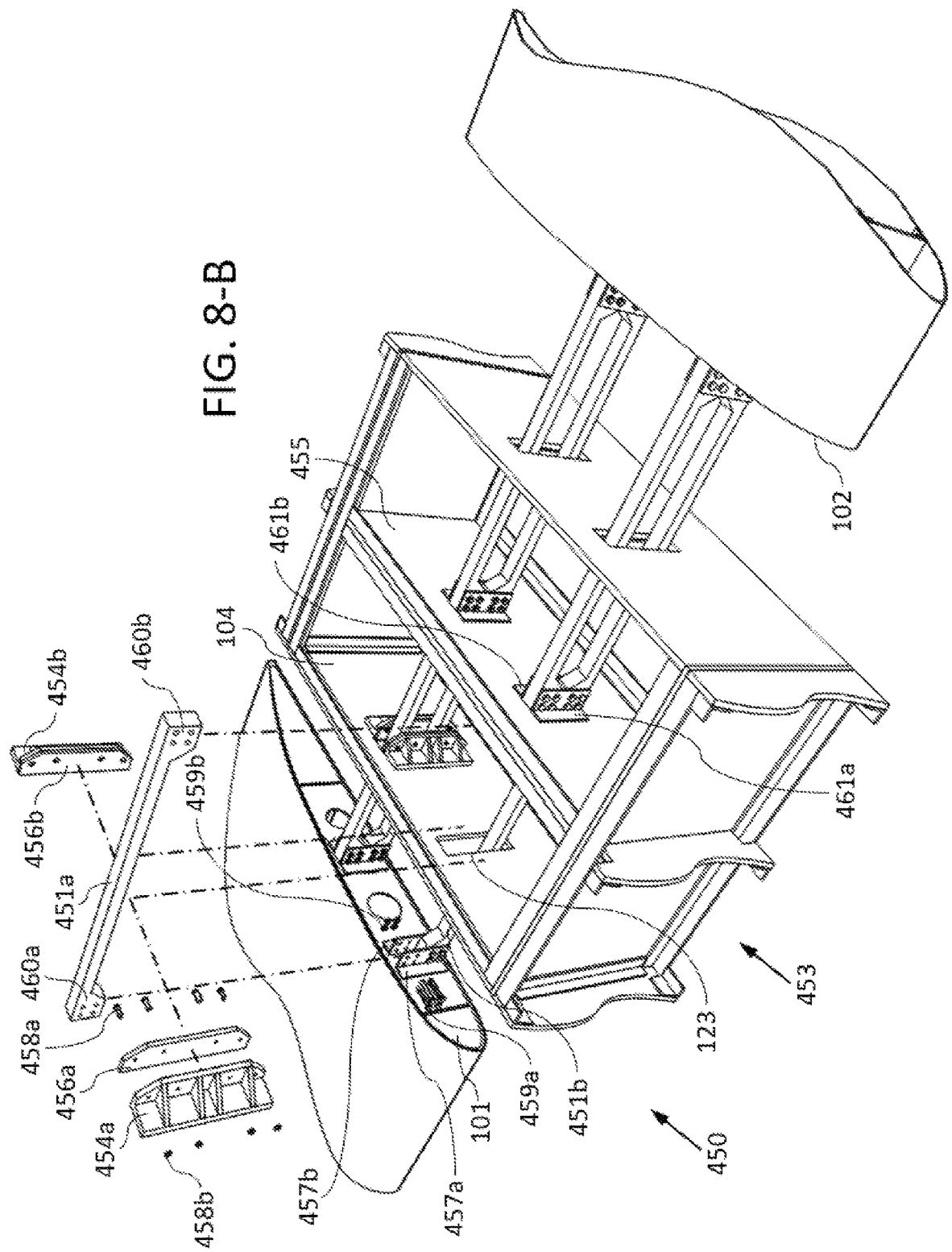

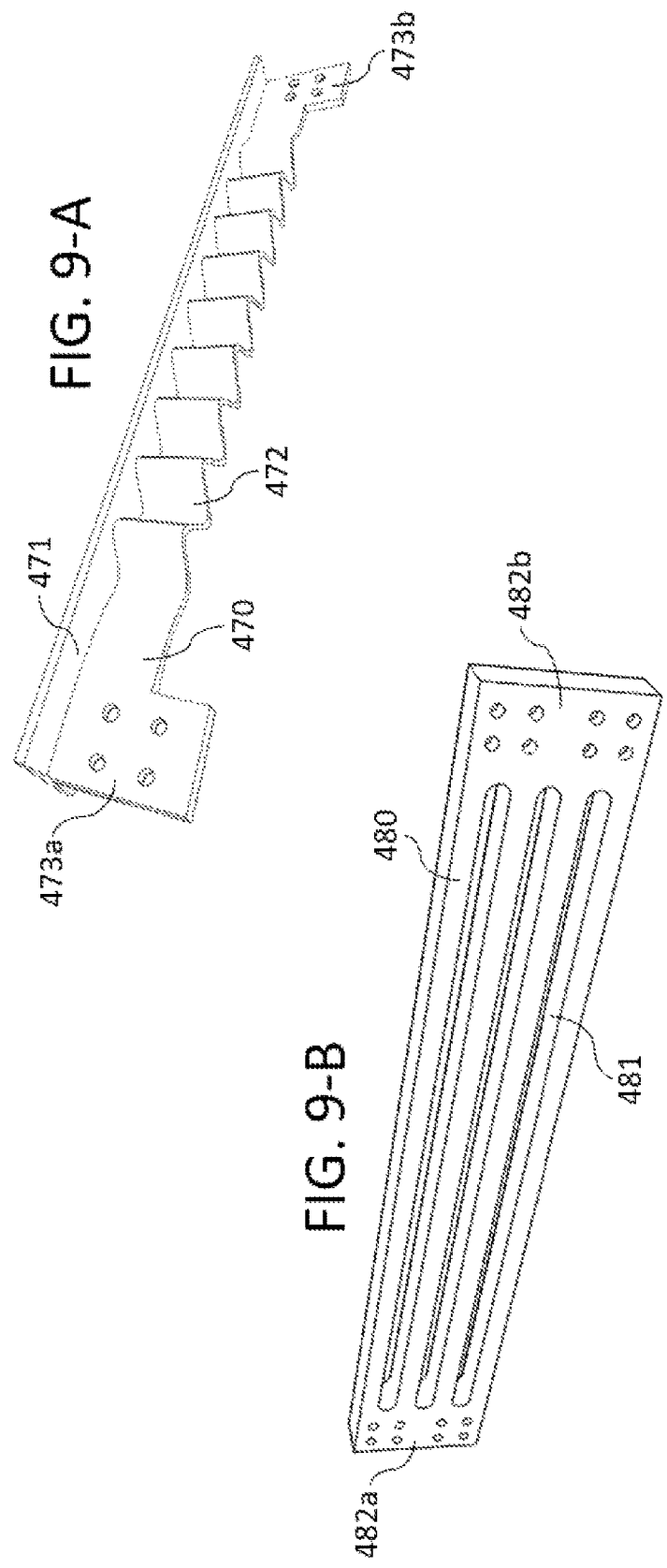
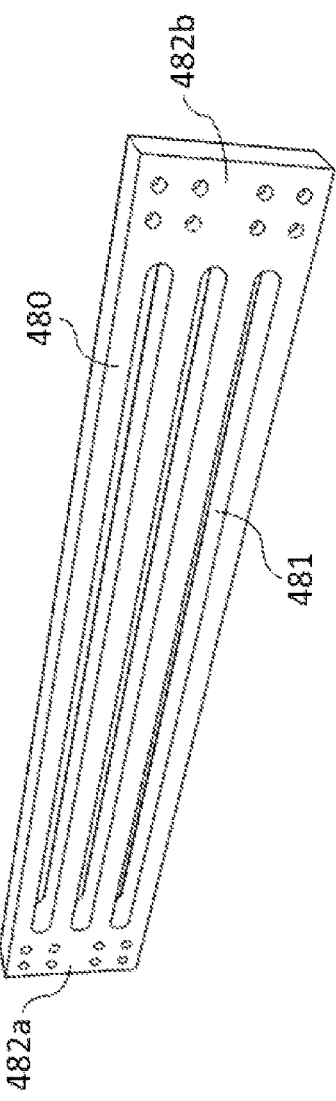
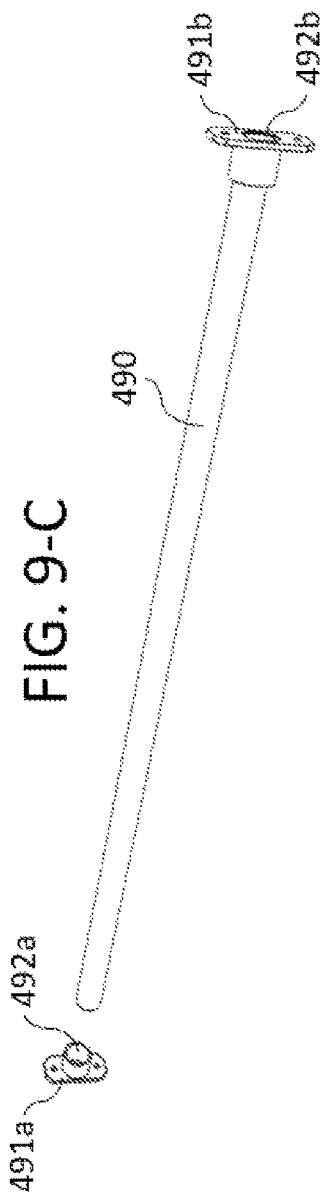

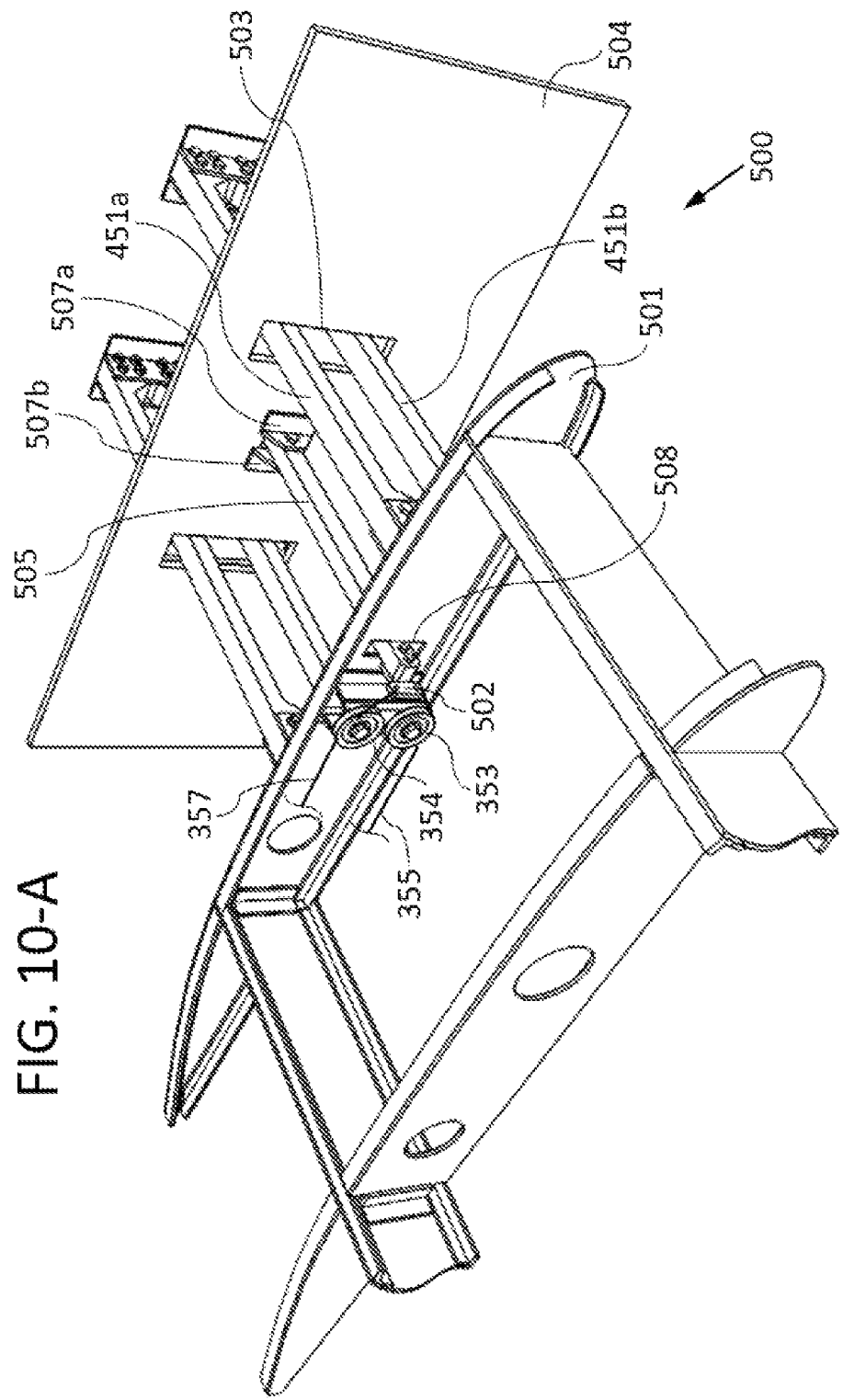
FIG. 10-A

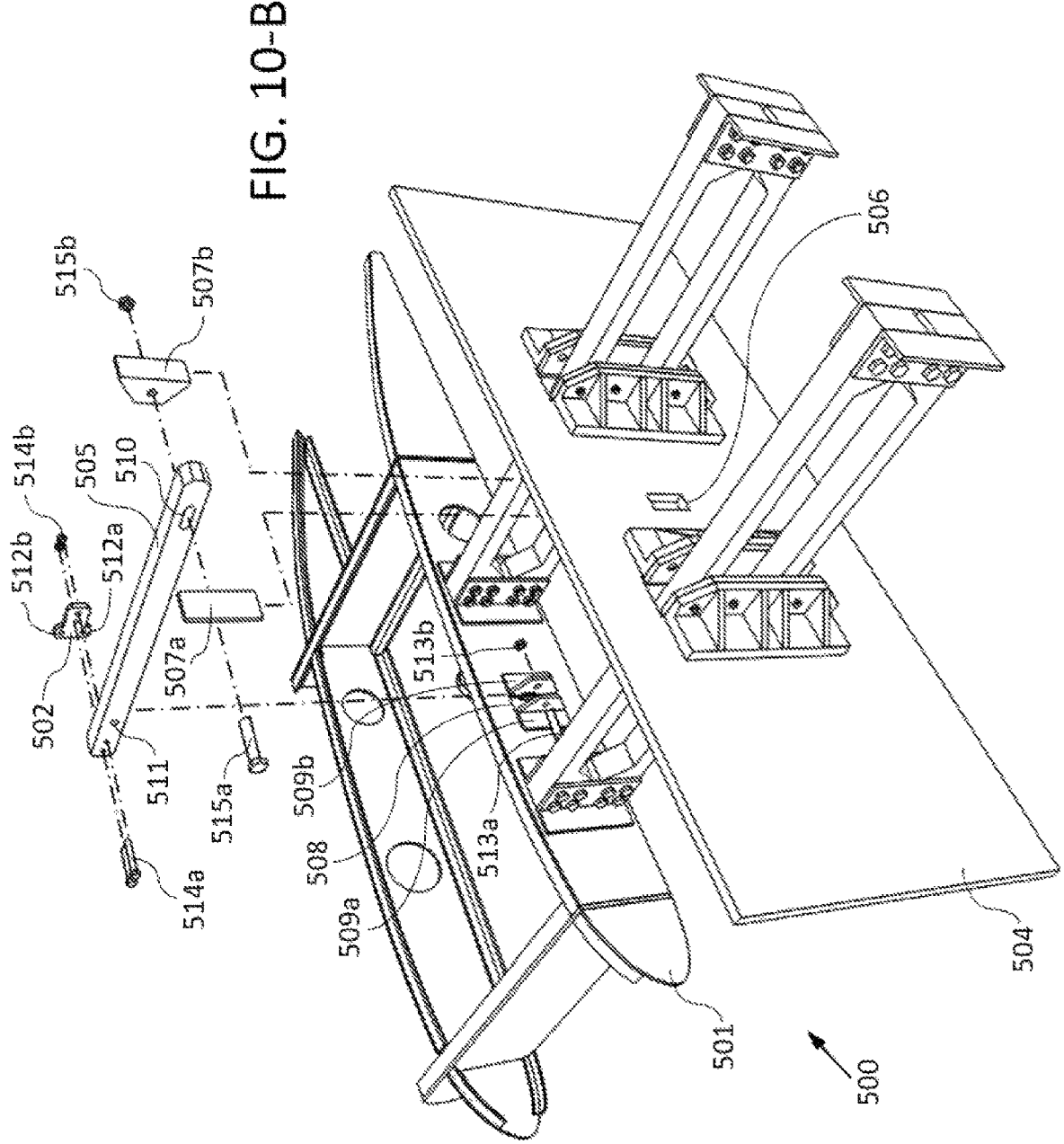
FIG. 10-B

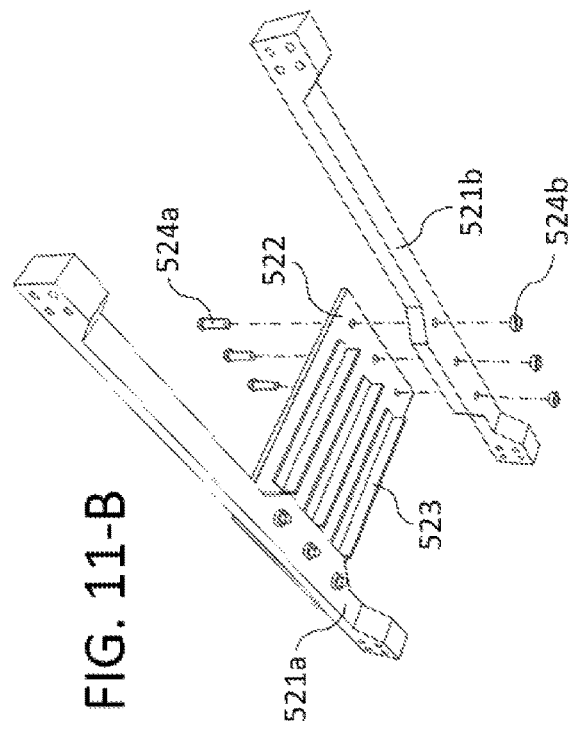
FIG. 11-B
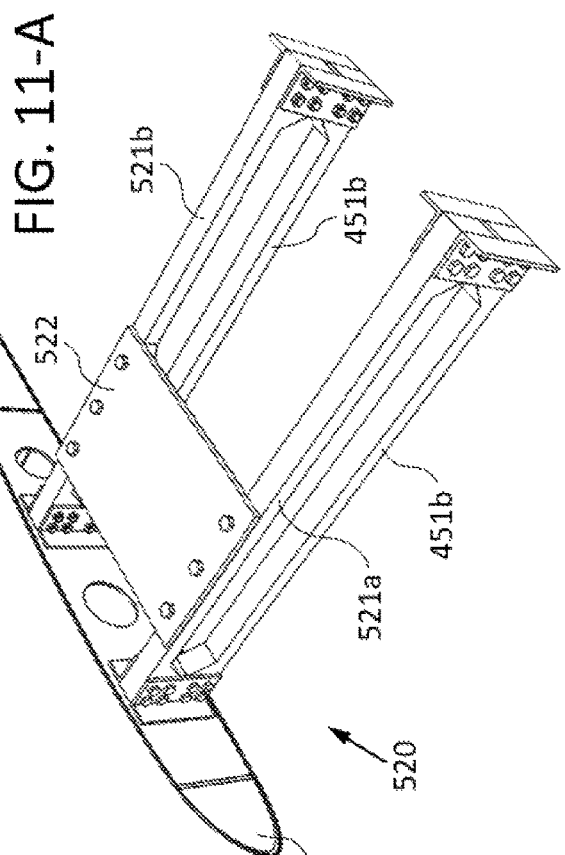
FIG. 11-A

COMPLIANT ROOT STRUCTURE FOR CONNECTING AN AIRFOIL TO A FUSELAGE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

Embodiments of this invention relate to aircraft structures. More particularly, embodiments of this invention relate to a compliant root structure for connecting an airfoil to an airplane fuselage.

Prior Art

A conventional airplane includes a fuselage and airfoils that are rigidly affixed to the fuselage. Examples of such airfoils include a right wing, a left wing, a horizontal stabilizer, and a vertical stabilizer. These airfoils generate the necessary aerodynamic forces required for controlled flight. However, when an airplane operates in a turbulent atmosphere the airfoils often experience abrupt aerodynamic loads due to variations in airflow. These abrupt aerodynamic loads cause undesirable perturbations on an airplane's inertial steady state while in flight, resulting in occupant discomfort, high structural peak loads, and disruptions in flight paths. Engineers have made few steps in overcoming such disadvantages.

For example, some conventional airplanes are designed to have wings that exhibit a high degree of flexure in an effort to dampen the effects such abrupt aerodynamic loads. Such designs have become prevalent in large transport airplanes that have large wingspans and incorporate composite members, which are generally more flexible than aluminum members. These features enable wings to bend a significant amount when subjected to abrupt aerodynamic loads, thereby dampening undesirable fuselage perturbations. However, the roots of these wings are still rigidly affixed to a fuselage, so undesirable dynamic loads are still transmitted thereto. Attempts have been made to overcome this issue by connecting an entire wing, which comprises a right wing and a left rigidly interconnected, to a fuselage by means of an active suspension system comprising struts, actuators, and sensors. However, in such embodiments the wing can displace an angular amount with respect to the fuselage, thereby redirecting the lift vector and introducing complex dynamic problems. In addition, such an active suspension system requires an onboard computer and an energy means for powering the actuators. Therefore, such a system is only feasible in large transport aircraft, and remains unfeasible for smaller airplane platforms that strive for low operating costs.

The embodiments of the present invention are directed towards the concerns mentioned above.

SUMMARY

In accordance with the present invention, a compliant root structure comprises upper connecting arms and lower connecting arms. The upper connecting arms and lower connecting arms pivotally connect an airfoil to a fuselage structure so that the airfoil can displace an amount relative to the fuselage structure in the direction relatively perpendicular to the spanwise and chordwise axes of the airfoil, therefore maintaining a relatively constant lift vector direction. The compliant root structure also comprises a spring means such as a leaf spring assembly or a shock absorber that is interconnected with the fuselage structure, upper connecting arms, and lower connecting arms. The spring means provides a restoring force to the airfoil when displaced relative to the fuselage structure beyond a steady state position. This compliant root structure dampens the dynamic response of the fuselage structure when the airfoil encounters abrupt aerodynamic loads due to a turbulent atmosphere.

In accordance with another embodiment thereof, the disclosure provides a stiffening mechanism that can limit the range in which the upper connecting arms and lower connecting arms can rotate, thereby limiting the range in which the airfoil can displace relative to the fuselage structure.

In accordance with another embodiment thereof, the disclosure provides an extension arm that can be affixed to either the upper connecting arm or the lower connecting arm. The extension arm can be configured with either a cable control system or a rotary encoder that is integrated with an autopilot system such to control an aileron to deflect in the same direction the airfoil is displaced relative to the fuselage structure, thereby producing a restoring aerodynamic force.

In accordance with another embodiment thereof, the disclosure provides upper connecting arms and lower connecting arms that possess relatively high flexibility, and are adapted to interconnect the airfoil and the fuselage structure by means of rigid joints. Stabilizing brackets are secured to the fuselage structure and prevent undesired buckling and twisting of the upper connecting arms and lower connecting arms when the airfoil is displaced relative to the fuselage structure.

DRAWINGS

Figures

FIG. 1-A is a top isometric view of the preferred embodiment of the compliant root structure for connecting an airfoil to a fuselage structure in accordance with the present invention;

FIG. 1-B is a top isometric detail view of the embodiment shown in FIG. 1-A;

FIG. 1-C is a top isometric exploded view of the embodiment shown in FIG. 1-A;

FIG. 2 is a top isometric exploded view of an alternate embodiment featuring shock absorbers;

FIG. 3-A is a top isometric view of an alternate embodiment featuring two airfoils interconnected by a means comprising a hinged lever;

FIG. 3-B is a top isometric exploded view of the embodiment shown in FIG. 3-A;

FIG. 4-A is a top isometric view featuring a stiffening mechanism;

FIG. 4-B is a top isometric exploded view of the stiffening mechanism shown in FIG. 4-A;

FIG. 5-A is a top isometric view of an alternate embodiment featuring an extension arm assembly, and an auxiliary aileron cable and pulley control system;

FIG. 5-B is a top isometric exploded view of the extension arm assembly shown in FIG. 5-A;

FIG. 5-C is a schematic block diagram of the auxiliary cable system of FIG. 5-A and an aileron and/or flap connected thereto;

FIG. 6-A is a top isometric view of an alternate embodiment featuring an extension arm assembly and a rotary encoder;

FIG. 6-B is a top isometric exploded view of the extension arm assembly shown in FIG. 6-A;

FIG. 7-A is a top isometric view of an alternate embodiment featuring additional stiffening members interconnecting the upper connecting arms;

FIG. 7-B is a bottom isometric exploded view of the stiffening members and upper connecting arms shown in FIG. 7-A;

FIG. 8-A is a top isometric view of an alternate embodiment featuring upper connecting arms and lower connecting arms that rigidly interconnect each airfoil with the fuselage structure, and stabilizing brackets;

FIG. 8-B is a top isometric exploded view of the embodiment shown in FIG. 8-A;

FIG. 9-A is a bottom isometric view of an alternate connecting arm featuring a corrugated surface;

FIG. 9-B is a top isometric view of an alternate connecting arm comprising a longitudinal plate with one or more slots;

FIG. 9-C is a top isometric view of an alternate connecting arm comprising a rod with a circular cross-section, FIG. 10-A is a top isometric view of an alternate embodiment featuring an auxiliary arm, and an auxiliary aileron cable and pulley control system;

FIG. 10-B is a top isometric exploded view of the embodiment show in FIG. 10-A;

FIG. 11-A is a top isometric view of an alternate embodiment featuring additional stiffening members interconnecting the upper connecting arms;

FIG. 11-B is a bottom isometric exploded view of the stiffening members and upper connecting arms shown in FIG. 11-A.

REFERENCE NUMERALS

100—Preferred Embodiment
101—Airfoil
102—Airfoil
103—Fuselage Structure
104—Fuselage Outer Wall
105—Fuselage Inner Wall
106a—Upper Connecting Arm
106b—Lower Connecting Arm
107—Leaf Spring Assembly
108—Mount
109—Rod
110—Elbow
111a—Link
111b—Link
112—Mount
113—Rod
114—Shackle
115a—Mount
115b—Mount
116—Retaining Collar
117—Rod
118—Bracket
119—Hole
120—Hole
121—Hole
122a—Mount
122b—Mount
123—Slot
124a—Bolt
124b—Nut
125a—Bolt
125b—Nut
126—Retaining Collar
127a—Bolt
127b—Nut
128a—Bolt
128b—Nut
129—Arm
130a—Hole
150—Alternate Embodiment
151—Shock Absorber
152—Holes
153—Hole
154—Elbow
155—Arm
156—Mount
157a—Bolt
157b—Nut
158a—Bolt
158b—Nut
200—Alternate Embodiment
201—Mount
202—Lever
203—Alternate Fuselage Structure
204a—Link
204b—Link
205—Fuselage Inner Wall
206—Hole
207a—Slot
207b—Slot
208a—Bolt
208b—Nut
300—Stiffening Mechanism
301—Cable Drum
302—Cable
303—Cable
304—Shaft
305—Fuselage Inner Wall
306—Tube
307—Link
308—Guide Plate
309—Stopper
310a—Mount
310b—Mount
311a—Hole
312—Key
313—Keyed Hole
314—Retaining Collar
315—Groove
316—Threads
317—Groove
318—Threaded Hole
319—Tab
320—Mount
321—Peg
322—Slot 323—Plate
324—Tab
325a—Bolt
325b—Nut
326a—Bolt
326b—Nut
327a—Bolt
327b—Nut
328a—Bolt
328b—Nut
350—Alternate Embodiment
351—Airfoil
352—Extension Arm
353—Pulley
354—Pulley
355—Cable
356—Connecting Arm
357—Cable
358—Slot
359a—Hole
359b—Hole
360a—Bolt
360b—Nut
400—Alternate Embodiment
401—Airfoil
402—Rotary Encoder
403—Extension Arm
404—Keyed Hole
405—Bracket
406—Keyed Shaft
408a—Bolt
408b—Nut
420—Alternate Embodiment
421a—Upper Connecting Arm
421b—Upper Connecting Arm
422—Plate
423—Stiffener
424a—Bolt
424b—Nut
450—Alternate Embodiment
451a—Upper Connecting Arm
451b—Lower Connecting Arm
453—Alternate Fuselage Structure
454a—Stabilizing Bracket
454b—Stabilizing Bracket
455—Fuselage Inner Wall
456a—Friction Plate
456b—Friction Plate
457a—Mount
457b—Mount
458a—Bolt
458b—Nut
459a—Bolt
459b—Nut
460a—End
460b—End
461a—Mount
461b—Mount
470—Alternate Connecting Arm
471—Flat Surface
472—Corrugated Surface
473a—End
473b—End
480—Alternate Connecting Arm
481—Slot
482a—End
482b—End
490—Alternate Connecting Arm
491a—Mount
491b—Mount
492a—Hole
492b—Hole
500—Alternate Embodiment
501—Airfoil
502—Tab
503—Slot
504—Fuselage Outer Wall
505—Auxiliary Arm
506—Slot
507a—Mount
507b—Mount
508—Slot
509a—Mount
509b—Mount
510—Slot
511—Hole
512a—Hole
512b—Hole
513a—Bolt
513b—Nut
514a—Bolt
514b—Nut
515a—Bolt
515b—Nut
520—Alternate Embodiment
521a—Upper Connecting Arm
521b—Upper Connecting Arm
522—Plate
523—Stiffener
524a—Bolt
524b—Nut Detailed Description—Preferred
Embodiment—FIG. 1-A Through FIG. 1-C FIG. 1-A shows a preferred embodiment 100 of the compliant root structure in accordance with the present invention. Preferred embodiment 100 comprises two upper connecting arms 106a, two lower connecting arms 106b, and a leaf spring assembly 107 configured to connect an airfoil 101 to a fuselage structure 103.

FIG. 1-B and FIG. 1-C further illustrate airfoil 101 and the associated components that connect it to fuselage structure 103. Note that most of the fuselage structure shown in FIG. 1-A is hidden in FIG. 1-B and FIG. 1-C for clarity. Airfoil 101 is connected to fuselage structure 103 by means of two upper connecting arms 106a and two lower connecting arms 106b. The upper connecting arms and lower connecting arms are preferably manufactured from metal, however, can also be manufactured from other materials such as wood, plastic, or composites. Each upper connecting arm 106a has a hole 119 located on one end, and holes 120, 121 proximate the end opposite hole 119. The holes of each upper connecting arm 106a are oriented so that the axes of the holes are all parallel with respect to each other. Lower connecting arms 106b have a similar hole pattern. Upper connecting arms 106a and lower connecting arms 106b are pivotally affixed to airfoil 101 by means of mounts 108. Each mount 108 is affixed to airfoil 101 preferably by means of fasteners such as rivets or bolts, and is sized to accept a bolt 124a and a nut 124b to act as a hinge joint for hole 119 of each upper connecting arm 106a and lower connecting arm 106b. However, note that in other embodiments the mounts can be machined integrally with components of the airfoil structure.

Upper connecting arms 106a and lower connecting arms 106b are also pivotally affixed to a fuselage outer wall 104 by means of mounts 122a, 122b. Each mount 122a, 122b is affixed to fuselage outer wall 104 preferably by means of fasteners such as rivets or bolts, and is sized to accept bolts 125a and nuts 125b to act as hinge joints for hole 120 of each upper connecting arm 106a and lower connecting arm 106b. Outer wall 104 comprises slots 123 between the locations where mounts 122a, 122b are affixed, thereby allowing clearance for upper connecting arms 106a and lower connecting arms 106b. Upper connecting arms 106a and lower connecting arms 106b are arranged so that the upper connecting arms are situated above the lower connecting arms, and the holes of the first upper connecting arm are aligned with the holes of the second upper connecting arm, and the holes of the first lower connecting arm are aligned with the holes of the second lower connecting arm.

Upper connecting arms 106a are interconnected by a rod 109. Rod 109 is preferably manufactured from metal and is sized to fit inside hole 121 of each upper connecting arm 106a. Similarly, lower connecting arms 106b are interconnected by a rod 113. Rods 109, 113 are interconnected by means of an elbow 110 such that the rods are each pivotally affixed to the elbow 110. Note that elbow 110 is secured along the length of rods 109, 113 by means of retaining collars 126. The retaining collars also secure rods 109, 113 between upper connecting arms 106a and lower connecting arms 106b respectively.

A mount 112 is affixed to the center of a leaf spring assembly 107, and links 111a, 111b are sized to accept bolts 127a and nuts 127b to act as hinge joints for interconnecting arm 129 of elbow 110 and mount 112 of leaf spring assembly 107.

The ends of leaf spring assembly 107 are pivotally suspended from the fuselage structure 103 by means of shackles 114. The shackles pivotally interconnect each end of the leaf spring assembly 107 with a rod 117. One end of each rod 117 is affixed to fuselage outer wall 104 by means of a mount 115a. The opposite end of each rod 117 is affixed to a fuselage inner wall 105 by means of a mount 115b. Each mount 115a has a hole 130a sized to accept rod 117. Mounts 115b have a similar geometry as mounts 115a. Mounts 115b are affixed directly to fuselage inner wall 105 preferably by means of rivets. Brackets 118 are affixed directly to fuselage outer wall 104 preferably by means of rivets and are sized such that each mount 115a can be affixed thereto with bolts 128a and nuts 128b. Note that leaf spring assembly 107 and shackles 114 are secured along the length of rods 117 by means of retaining collars 116.

Note that an airfoil 102 is connected to fuselage structure 103 in a similar and mirrored fashion as airfoil 101, as shown in FIG. 1-A.

Note that in other embodiments the quantity of upper connecting arms 106a and lower connecting arms 106b can vary as long as there exists at least one upper connecting arm and two lower connecting arms, or two upper connecting arms and one lower connecting arm connecting each airfoil 101, 102 to fuselage structure 103. Also, in other embodiments an aerodynamic fairing can be affixed to each airfoil 101, 102 that extends toward fuselage structure 103, thereby shielding upper connecting arms 106a and lower connecting arms 106b from damage, as well as reducing aerodynamic drag. In addition, note that preferred embodiment 100 comprises a combination of bolts and nuts to act as hinge joints. In other embodiments these bolts and nuts can be substituted with pins. Also, note that additional structural supports can be added to strengthen the fuselage structure, including additional plates and stiffeners, as common with conventional fuselage structures.

Preferred embodiment 100 shown in FIG. 1-A illustrates the presence of two airfoils 101, 102 connected to fuselage structure 103. This embodiment is representative of connecting wings or horizontal stabilizers to a fuselage structure. Note that in other embodiments, airfoil 102 and associated structure can be omitted, wherein only one airfoil is connected to the fuselage structure. Such an embodiment can be oriented to represent connecting a vertical stabilizer to a fuselage structure.

Operation—Preferred Embodiment—FIG. 1-A Through FIG. 1-C

FIG. 1-A through FIG. 1-C illustrate the manner of operation of preferred embodiment 100 of the compliant root structure. As shown in FIG. 1-A, airfoils 101, 102 are connected to fuselage structure 103 by means of upper connecting arms 106a and lower connecting arms 106b. As shown in FIG. 1-B, since upper connecting arms 106a and lower connecting arms 106b interconnect each airfoil with outside fuselage wall 104 by means of hinged joints, each airfoil has a tendency to collapse or lower with respect to the fuselage structure while at rest due to the force of gravity. However, since each leaf spring assembly 107 is suspended from and pivotally affixed to outer fuselage wall 104 and inner fuselage wall 105 of fuselage structure 103, and each leaf spring assembly 107 is also pivotally affixed to upper connecting arms 106a and lower connecting arms 106b of each airfoil, the leaf springs act to counterbalance the tendency of each airfoil to collapse or lower with respect to the fuselage structure 103 while at rest due to the force of gravity, thus giving each airfoil a steady state position with respect to the fuselage structure. Likewise, when the airfoils are subjected to a constant airflow and a resulting lift force, leaf spring assemblies 107 act to counterbalance each airfoil from raising excessively with respect to the fuselage structure 103, thus giving the airfoils a distinct steady state position with respect to the fuselage structure.

Since leaf spring assemblies 107 exhibit spring characteristics, wherein the restoring forces are proportional to the deformation thereof, the leaf spring assemblies aid in dampening the undesirable effects of a turbulent atmosphere on the dynamics of an airplane. The leaf spring assemblies reduce perturbations transmitted to fuselage structure 103 when the airfoils encounter abrupt aerodynamic loads, thereby improving occupant comfort and reducing the internal dynamic stresses of the overall airplane structure.

Note that the arrangement of upper connecting arms 106a and lower connecting arms 106b allows for an amount of relative displacement of each airfoil with respect to fuselage structure 103 in the direction approximately perpendicular to the spanwise and chordwise axes of the airfoil, but inhibits relative rotation. As a result, the airfoils act to remain parallel to the surface of Earth when the airplane is in straight flight, even when perturbed by a turbulent atmosphere. This is important since it optimizes the production of lift required for level flight.

Description—Alternate Embodiments—FIG. 2 Through FIG. 11-B

The compliant root structure of the present invention can comprise alternate embodiments as illustrated in FIG. 2 through 11-B.

FIG. 2 shows an alternate embodiment 150. Alternate embodiment 150 is similar to preferred embodiment 100, however, unlike preferred embodiment 100 which comprises leaf spring assemblies 107 to restore and dampen relative displacements of airfoils 101, 102, alternate embodiment 150 comprises shock absorbers 151, each having holes 152 on one end, and a hole 153 on the end opposite holes 152. Elbows 154 interconnect rods 109, 113 of upper connecting arms 106a and lower connecting arms 106b. Arm 155 of each elbow 154 is sized to accept a bolt 157a and a nut 157b to act as a hinge joint for holes 152 on each shock absorber 151. Mounts 156 are affixed directly to fuselage inner wall 105 preferably by means of rivets and are sized to accept a bolt 158a and a nut 158b to act as a hinge joint for hole 153 on each shock absorber 151. Alternate embodiment 150 can be advantageous because of the reduction in part count relative to preferred embodiment 100.

FIG. 3-A shows an alternate embodiment 200. Alternate embodiment 200 is similar to preferred embodiment 100, however, the compliant root structures connecting each airfoil 101, 102 to the fuselage structure are also interconnected by means of a mount 201 and a lever 202. As shown in exploded view FIG. 3-B, lever 202 is a longitudinal member with a slot 207a on one end, and a slot 207b on the end opposite slot 207a. Lever 202 also has a hole 206 located in the center thereof. Mount 201 is affixed to a fuselage inner wall 205 of an alternate fuselage structure 203 preferably by means of fasteners such as rivets or bolts, and is sized to accept a bolt 208a and a nut 208b to act as a hinge joint for hole 206 of lever 202. Links 204a, 204b are sized to accept bolts 127a and nuts 127b to act as hinge joints for pivotally connecting slot 207a of lever 202 with elbow 110 and mount 112 of leaf spring assembly 107 associated with airfoil 101. Slot 207b is connected with the compliant root structure associated with airfoil 102 in a similar fashion. This embodiment constrains the motion of airfoils 101, 102 to displace in opposite directions with respect to each other, thereby employing both airfoils 101, 102 and associated leaf spring assemblies 107 in dampening the undesirable rolling effects associated with asymmetric airfoil loading due to a turbulent atmosphere.

Alternate embodiment 200 features lever 202 that is pivotally affixed to mount 201, and mount 201 is rigidly affixed to fuselage inner wall 205 of alternate fuselage structure 203. However, in other embodiments fuselage inner wall 205 and mount 201 can be replaced with a fuselage inner wall 305, a mount 320, and a stiffening mechanism 300 as shown in FIG. 4-A and exploded view FIG. 4-B. Mount 320 is sized to accept a bolt 328a and a nut 328b to act as a hinge joint for hole 206 of lever 202. Mount 320 is preferably manufactured by a machining or molding means to have a peg 321 protruding from itself in the same direction as the axis of bolt 328a. Although in other embodiments, peg 321 can be manufactured as a separate part and fastened or welded to mount 320. Peg 321 is sized to fit and slide within slot 322 of a guide plate 308. Guide plate 308 is preferably manufactured from metal and is rigidly affixed to fuselage inner wall 305 so that slot 322 is aligned with the direction in which the airfoils are capable of displacing with respect to the fuselage structure of this invention. Mount 320 is constrained to only move along the direction of slot 322 of guide plate 308 due to the interaction between peg 321 and the slot.

Mount 320 is also connected to a shaft 304 by means of a link 307 and a tube 306. Tube 306 is hollow and has an inner diameter slightly greater than the diameter of shaft 304 such that it can slide along the length thereof. Tube 306 has a tab 319 affixed along the outer surface preferably by a welding means. In other embodiments, tube 306 and tab 319 can be machined or molded as one part. Link 307 is sized to accept bolts 326a, 327a and nuts 326b, 327b to act as hinge joints for interconnecting mount 320 and tab 319 of tube 306.

Shaft 304 is affixed to fuselage inner wall 305 by means of mounts 310a, 310b and plate 323, wherein shaft 304 can still rotate. Mount 310a has a hole 311a sized to accept shaft 304. Mount 310b has similar geometry as mount 310a. Mounts 310a, 310b are rigidly secured to plate 323 and fuselage inner wall 305 by means of bolts 325a and nuts 325b.

Shaft 304 has a region of external threads 316 along the length thereof. A stopper 309 is preferably manufactured as metal and has a threaded hole 318 such that the stopper can be disposed along the length of shaft 304 and engage with threads 316. Stopper 309 has a groove 317 on the outer surface thereof. Groove 317 is sized to engage with a tab 324 on plate 323 such that the tab prevents rotation of stopper 309 relative to the plate. Tab 324 is preferably welded to plate 323, however, in other embodiments tab 324 and plate 323 can be molded or machined as a single part. Shaft 304 also has a groove 315 along the outer surface thereof. A cable drum 301 has a keyed hole 313 such that the cable drum can be disposed along the length of shaft 304 and affixed thereon by means of a key 312 and groove 315 such that the cable drum and the shaft rotate as one. Cable drum 301 is additionally constrained to shaft 304 such that it does not slide along the length thereof by means of retaining collars 314. As shown in FIG. 4-A, cables 302, 303 are affixed to cable drum 301 so that applying tension to cable 302 and relaxing cable 303 results in rotation of the cable drum 301 and shaft 304 in one direction, and applying tension to cable 303 and relaxing cable 302 results in rotation of the cable drum 301 and shaft 304 in the opposition direction.

Stiffening mechanism 300 functions by a user operating cables 302, 303 to adjust the angular position of shaft 304. As the angular position of the shaft is adjusted, stopper 309 moves along the length thereof due to the interaction of threads 318 of the stopper with threads 316 of the shaft. The position of stopper 309 controls the amount that tube 306 is able to freely travel along the length of shaft 304. Resultingly, this controls the amount of which mount 320 is able to freely displace along the length of slot 322 of guide plate 308. When slots 207a, 207b of lever 202 are connected with the compliant root structures of airfoils 101, 102 respectively, similar to the interconnection shown in FIG. 3-B of embodiment 200, the degree to which the airfoils can displace can be controlled. For example, if the airfoils represent the wings on an airplane, a user can stiffen the compliant root structures to exhibit stiffness characteristics of a conventional wing such to have more responsive roll control for landing purposes. The user can do this by operating cables 302, 303 to position stopper 309 closer to mount 310a, thereby raising mount 320 and lowering airfoils 101, 102, and effectively limiting the degree to which the airfoils can displace. Alternatively, the user can operate cables 302, 303 in the opposite manner, thereby increasing the degree to which the airfoils can displace and improving the ability of the embodiment to dampen undesirable abrupt aerodynamic loads. Note that cables 302, 303 can be incorporated with a user control mechanism similar to a conventional cockpit trim wheel and pulley system common to aviation so the user can conveniently control stiffening assembly 300 in the manner presented. In other embodiments, cables 302, 303 can be combined with electromechanical devices such as servos and motors such to automate the control of stiffening assembly 300.

FIG. 5-A shows an alternate embodiment 350. Alternate embodiment 350 is similar to previous embodiments such as preferred embodiment 100, however, alternate embodiment 350 further comprises an auxiliary cable system for controlling an aileron. Connecting arm 356 is similar to upper connecting arm 106a and lower connecting arms 106b, but is sized to so that an extension arm 352 can be affixed thereon by means of bolts 360a and nuts 360b, as shown in exploded view FIG. 5-B. Connecting arm 356 is pivotally affixed to an airfoil 351 by means of mount 108, similar to upper connecting arm 106a and lower connecting arms 106b. Extension arm 352 is sized and oriented on connecting arm 356 such that it can fit inside a slot 358 of airfoil 351. Pulleys 353, 354 are secured to the airfoil and are located in close proximity to extension arm 352. Extension arm 352 has holes 359a, 359b which are sized to except the ends of cables 355, 357 respectively. The cables can be constrained to holes 359a, 359b of extension arm 352 by means of shank balls which are common to conventional aircraft control cable systems. Cables 355, 357 are guided away from extension arm 352 using pulleys 353, 354 respectively. The free ends of cables 355, 357 can be configured with an existing or a secondary aileron or flap A attached to airfoil 351 to deflect in the same direction of the relative displacement of airfoil 351 with respect to the fuselage structure (see FIG. 5-C), thereby producing an aerodynamic force in the direction opposite the relative displacement of the airfoil with respect to the fuselage. This feature acts to counteract abrupt aerodynamic loads that the airfoil experiences due to a turbulent atmosphere. Note that in other embodiments, extension arm 352, pulleys 353, 354, and cables 355, 357 can exist inside the fuselage structure instead of inside airfoil 351.

FIG. 6-A shows an alternate embodiment 400. Alternate embodiment 400 is similar to alternate embodiment 350, however, alternate embodiment 400 comprises a rotary encoder 402 to be integrated with a conventional aileron autopilot means rather than aileron control cables. An extension arm 403 is affixed to connecting arm 356 by means of bolts 360a and nuts 360b, as shown in exploded view FIG. 6-B. Rotary encoder 402 is affixed to an airfoil 401 by means of a bracket 405, bolts 408a, and nuts 408b, and is located in close proximity to extension arm 403. Extension arm 403 has a keyed hole 404 sized to accept a keyed shaft 406 of rotary encoder 402. As a result, the angular position of keyed shaft 406 depends on the displacement of airfoil 401. For example, if airfoil 401 experiences an abrupt aerodynamic load due to a turbulent atmosphere, the airfoil will begin to displace relative to the fuselage structure. Rotary encoder 402 is able to detect this displacement, and therefore can be configured with a conventional aileron autopilot means to actuate an aileron to produce an aerodynamic force that counteracts the displacement of the airfoil due to a turbulent atmosphere. Note that in other embodiments, extension arm 403 and rotary encoder 402 can be configured so that the rotary encoder is affixed to the fuselage structure rather than airfoil 401. In addition, one or more linkages can be used to interconnect extension arm 403 and rotary encoder 402, thereby reducing stresses imposed on the rotary encoder. Also, in other embodiments a linear encoder can be used instead of a rotary encoder.

FIG. 7-A shows an alternate embodiment 420. Alternate embodiment 420 is similar to previous embodiments such as preferred embodiment 100, however, alternate embodiment 420 comprises a plate 422 and stiffeners 423 interconnecting upper connecting arms 421a, 421b. As shown in exploded view FIG. 7-B, plate 422 is affixed to the upper connecting arms by means of bolts 424a and nuts 424b. However, in other embodiments, plate 422 can be affixed to the upper connecting arms by means of rivets. In addition, a plurality of stiffeners 423 are affixed to plate 422 and disposed in between upper connecting arms 421a, 421b, preferably by means of fasteners such as rivets. The additional structural members, plate 422 and stiffeners 423, aid in preventing twisting and bucking of the upper connecting arms, thereby maintaining the stability of the airfoil and the strength of the upper connection arms. Note that in other embodiments only plate 422 can be used to interconnect upper connecting arms 421a, 421b, without the presence of stiffeners 423. Similarly, only stiffeners 423 can be used to interconnect the upper connecting arms, without the presence of plate 422. Also, note that in other embodiments lower connecting arms 106b can be interconnected with similar structural members.

FIG. 8-A shows an alternate embodiment 450. Unlike preferred embodiment 100 which comprises upper connecting arms 106a, lower connecting arms 106b, and leaf spring assemblies 107, alternate embodiment 450 comprises upper connecting arms 451a, lower connecting arms 451b, and stabilizing brackets 454a, 454b, wherein upper connecting arms 451a and lower connecting arms 451b connect airfoils 101, 102 with fuselage structure 450 by means of rigid joints rather than hinge joints, as shown in exploded view FIG. 8-B. Upper connecting arms 451a are preferably manufactured from metal and are long and slender in shape, preferably with a rectangular cross-section, however, can also be manufactured from other materials such as wood, plastic, or composites. Each upper connecting arm 451a comprises ends 460a, 460b. Mounts 457a, 457b are affixed to airfoil 101 preferably by means of rivets, and are sized such that end 460a of each upper connecting arm 451a can be rigidly affixed thereto by means of bolts 459a and nuts 459b. Similarly, mounts 461a, 461b are affixed to a fuselage inner wall 455 of an alternate fuselage structure 453 preferably by means of rivets and are sized such that end 460b of each upper connecting arm 451a can be rigidly affixed thereto. Note that lower connecting arms 451b have a similar geometry as upper connecting arms 451a and also interconnect airfoil 101 and fuselage inner wall 455 by means of mounts 457a, 457b and mounts 461a, 461b.

Alternate fuselage structure 453 comprises a fuselage outer wall 104 located between fuselage inner wall 455 and each airfoil 101, 102. Fuselage outer wall 104 has slots 123 sized to allow upper connecting arms 451a and lower connecting arms 451b to pass through. Located proximal one edge of each slot 123 is stabilizing bracket 454a. Stabilizing bracket 454b is located proximal the edge of each slot 123 opposite stabilizing bracket 454a. Stabilizing brackets 454a, 454b are affixed to fuselage outer wall 104 preferably by means of rivets. Stabilizing brackets 454a are each sized to support a friction plate 456a, by means of bolts 458a and nuts 458b. Similarly, stabilizing brackets 454b are each sized to support a friction plate 456b. Friction plates 456a, 456b are sized to extend to close proximity or to make contact with the sides of upper connecting arms 451a and lower connecting arms 451b. Friction plates are preferably manufactured from a low friction material such as polytetrafluoroethylene, but can also be made from other materials. Note that airfoil 102 is connected to alternate fuselage structure 453 by the same manner in which airfoil 101 is connected.

Alternate embodiment 450 is advantageous since the mounting conditions enable upper connecting arms 451*a* and lower connecting arms 451*b* to absorb strain energy, thereby eliminating the need for leaf spring assemblies 107 present in preferred embodiment 100. For example, when airfoils 101, 102 encounter abrupt aerodynamic loads, the airfoils displace a certain distance relative to alternate fuselage structure 453. As a result, upper connecting arms 451*a* and lower connecting arms 451*b* deform, thereby damping any perturbations transmitted to alternate fuselage structure 453, and providing a restoring force to the displaced airfoils. Friction plate 456*a*, 456*b* act to stabilize the deformation of upper connecting arms 451*a* and lower connecting arms 451*b*, thereby inhibiting undesirable twisting and buckling. Note other embodiments can exclude friction plates 456*a*, 456*b*, thereby relying on just stabilizing brackets 454*a*, 454*b* to make direct contact with upper connecting arms 451*a* and lower connecting arms 451*b*. Alternatively, stabilizing brackets 454*a*, 454*b* can be excluded, thereby relying on the perimeter of slots 123 of alternate fuselage structure 453 to make direct contact with upper connecting arms 451*a* and lower connecting arms 451*b*. Also note that in other embodiments stabilizing brackets 454*a*, 454*b* can incorporate rollers to make contact with upper connecting arms 451*a* and lower connecting arms 451*b*, thereby reducing friction. Additionally, fuselage inner wall 455 can be excluded, and each airfoil 101, 102 can be affixed to the farthest fuselage outer wall 104.

Note that each upper connecting arm 451*a* and lower connecting arm 451*b* can be substituted with an alternate connecting arm 470 as shown in FIG. 9-A. Alternate connecting arm 470 comprises a longitudinal flat surface 471 and a corrugated surface 472. Flat surface 471 and corrugated surface 472 are preferably manufactured from sheet metal as two separate pieces, and affixed to each other by a welding means, resembling a T-section. In other embodiments, corrugated surface 472 can be affixed to flat surface 471 by means of additional clips and rivets. Alternate connecting arm 470 comprises ends 473*a*, 473*b* that can be affixed to mounts 457*a*, 457*b* and mounts 461*a*, 461*b* shown in FIG. 8-B. Corrugated surface 472 enables alternate connecting arm 470 to experience a relatively large deformation and absorb large amounts of strain energy.

Alternatively, each upper connecting arm 451*a* and lower connecting arm 451*b* can be substituted with an alternate connecting arm 480 as shown in FIG. 9-B. Alternate connecting arm 480 is a plate that has one or more slots 481 and comprises ends 482*a*, 482*b* that can be affixed to mounts 457*a*, 457*b* and mounts 461*a*, 461*b* shown in FIG. 8-B. Alternate connecting arm 480 is easily manufacturable and has relatively high strength characteristics, yet still exhibits enough compliance to substitute for upper connecting arms 451*a* and lower connecting arms 451*b*.

Alternatively, each upper connecting arm 451*a* and lower connecting arm 451*b* can be substituted with an alternate connecting arm 490 as shown in FIG. 9-C. Alternate connecting arm 490 is preferably manufactured as a hollow metal pipe, but can also be manufactured as a composite material. Mounts 491*a*, 491*b* are used instead of mounts 457*a*, 457*b* and mounts 461*a*, 461*b* shown in FIG. 8-B. Mount 491*a* has a hole 492*a* such that the end of alternate connecting arm 490 can be inserted into and affixed inside, preferably by a welding means. Likewise, mount 491*b* has a hole 492*b* and is affixed to the end of alternate connecting arm 490 opposite mount 491*a*. Mounts 491*a*, 491*b* are affixed to the airfoil and inner fuselage wall 455 respectively, preferably by means of fasteners, such as bolts and nuts. Alternate connecting arm 490 is advantageous since it is simple to manufacture.

FIG. 10-A shows an alternate embodiment 500. Alternate embodiment 500 is similar to alternate embodiment 450, however, alternate embodiment 500 further comprises the features of an auxiliary cable system for controlling an aileron as previously presented in alternate embodiment 350. An auxiliary arm 505 has a slot 510 on one end and a hole 511 on the end opposite slot 510 as shown in exploded view FIG. 10-B. Additionally, a tab 502 is affixed to auxiliary arm 505 proximal hole 511 by means of bolts 514*a* and nuts 514*b*. Auxiliary arm 505 pivotally connects with airfoil 501 and fuselage outer wall 504 by means of mounts 507*a*, 507*b* and mounts 509*a*, 509*b*. Mounts 507*a*, 507*b* are affixed to fuselage outer wall 504 preferably by means of rivets, and are sized to accept a bolt 515*a* and a nut 515*b* to act as a hinge joint for slot 510 of auxiliary arm 505. Similarly, mounts 509*a*, 509*b* are affixed to airfoil 501 preferably by means of rivets, and are sized to accept a bolt 513*a* and a nut 513*b* to act as a hinge joint for hole 511 of auxiliary arm 505. Fuselage outer wall 504 has slots 503, 506 to provide clearance for upper connecting arms 451*a*, lower connecting arms 451*b*, and auxiliary arm 505. Similarly, airfoil 501 has a slot 508 sized such that auxiliary arm 505 and tab 502 can pass through. Pulleys 353, 354 are secured to airfoil 501 and are located in close proximity to tab 502. Tab 502 has holes 512*a*, 512*b* which are sized to except the ends of cables 355, 357. The cables can be constrained to holes 512*a*, 512*b* of tab 502 by means of shank balls which are common to conventional aircraft control cable systems. Cables 355, 357 are guided away from tab 502 using pulleys 353, 354 respectively. The free ends of cables 355, 357 can be configured with an existing or a secondary aileron or flap on airfoil 501 to deflect in the same direction of the relative displacement of airfoil 501 with respect to the fuselage structure, thereby producing an aerodynamic force in the direction opposite the relative displacement of the airfoil with respect to the fuselage structure. This feature acts to counteract abrupt aerodynamic loads that the airfoil experiences due to a turbulent atmosphere. Note that in other embodiments tab 502, pulleys 353, 354, and cables 355, 357 can exist inside the fuselage structure instead of inside airfoil 501.

FIG. 11-A shows an alternate embodiment 520. Alternate embodiment 520 is similar to alternate embodiment 450, however, alternate embodiment 520 further comprises additional stiffening structures as previously presented in alternate embodiment 420. As shown in exploded view FIG. 11-B, a plate 522 is affixed to upper connecting arms 521*a*, 521*b* by means of bolts 524*a* and nuts 524*b*. However, in other embodiments, plate 522 can be affixed to the upper connecting arms by means of rivets. In addition, a plurality of stiffeners 523 are affixed to plate 522 and disposed in between upper connecting arms 521*a*, 521*b* preferably by means of fasteners such as rivets. The additional structural members, plate 522 and stiffeners 523, aid in preventing twisting and buckling of the upper connecting arms, thereby maintaining the stability of airfoil 101 and the strength of the upper connecting arms. Note that in other embodiments, only plate 522 can be used to interconnect upper connecting arms 521*a*, 521*b*, without the presence of stiffeners 523. Similarly, only stiffeners 523 can be used to interconnect upper connecting arms 521*a*, 521*b*, without the presence of plate 522. Also, note that in other embodiments lower connecting arms 451*b* can be interconnected with similar structural members.

CONCLUSION, RAMIFICATIONS, AND SCOPE

Accordingly, the reader will see that the compliant root structure of the present invention provides a means for connecting one or more airfoils to a fuselage structure so that when each airfoil experiences an abrupt aerodynamic force caused by a turbulent atmosphere, the motion of the airfoil and the deformation of the corresponding compliant root structure dampens the dynamic response transmitted to the fuselage structure. Furthermore, the compliant root structure has the additional advantages in that

- this structure improves the comfort of airplane occupants by reducing fuselage perturbations;
- this structure reduces overall structural and payload peak stresses by means of shock absorbing features;
- this structure does not require a power source or computer to operate.
- this structure can be configured with a mechanism that can limit the dynamic response of the airfoils, thereby offering variable flight handling characteristics that can be adjusted by a flight crew member or an autopilot system appropriate for the phase of flight.
- this structure inhibits relative rotation of the airfoil with respect to the fuselage structure, thereby maintaining optimal lift vector directions required for straight flight, and preventing stability and control issues.

While the above description contains many specificities, these should not be construed as limitations on the scope of the invention, but as exemplifications of the presently preferred embodiments thereof. Many other ramifications and variations are possible within the teachings of the invention. The invention can be applied to airplanes on a small or large scale, ranging from model airplanes to large transport airplanes; aerodynamic fairings can be attached to each airfoil that extend to the fuselage structure; additional structural members that were not otherwise presented in an effort to promote clarity of the invention can be added within the fuselage structure to increase integrity; the compliant root structure can not only be applied to airplane wings, but also to horizontal stabilizers and vertical stabilizers, as well as to hydrofoils on aquatic vehicles, etc.

Thus, the scope of the invention should be determined by the appended claims and their legal equivalents, and not by the examples given above.

I claim:

1. A compliant root structure for connecting an airfoil to a fuselage structure, comprising:
   (a.) three or more connecting arms, wherein each of said connecting arms is a rigid longitudinal member comprising a first end and a second end, wherein said first end of each said connecting arm is configured to be pivotally affixed to a root of said airfoil by means of a first hinge mount, wherein each of said connecting arms is also configured to be pivotally affixed to said fuselage structure by means of a second hinge mount at a distance along a length of said connecting arm between said first end and said second end, wherein said connecting arms are positioned with respect to each other such that the connecting arms do not all reside in a single plane; and
   (b.) a restoring force means configured to be interconnected with said fuselage structure and said connecting arms for providing a restoring force to angular displacements of said connecting arms from a neutral position with respect to said fuselage structure;
   wherein said compliant root structure is configured to allow for relative displacement of said airfoil with respect to said fuselage structure in a direction approximately perpendicular to chordwise and spanwise axes of said airfoil by an amount proportional to aerodynamic loads imposed, thereby being configured to dampen a dynamic response of said fuselage structure when said airfoil encounters abrupt aerodynamic loads due to a turbulent atmosphere.

2. The compliant root structure according to claim 1, wherein said restoring force means comprises a leaf spring assembly.

3. The compliant root structure according to claim 1, wherein said restoring force means comprises a shock absorber.

4. The compliant root structure according to claim 1, further comprising a central hinge mount and a lever, wherein said central hinge mount is affixed to the center of said fuselage structure, wherein the center of said lever is pivotally affixed to said central hinge mount, wherein said lever comprises a first slot and a second slot, wherein said first slot is positioned on one end of said lever and said second slot is positioned on the end of said lever opposite said first slot, wherein said lever acts as a means for interconnecting said airfoil with a second and horizontally opposed airfoil such that said airfoils are constrained to displace in opposite directions with respect to each other.

5. The compliant root structure according to claim 1, further comprising a central hinge mount, a means for vertically displacing said central hinge mount, and a lever, wherein said means for vertically displacing said central hinge mount is affixed to the center of said fuselage structure and comprises two cables, a cable drum, a threaded shaft, a moving stopper, linkages to interconnect said central hinge mount to said threaded shaft, and a vertical guide plate, wherein the center of said lever is pivotally affixed to said central hinge mount, wherein said lever comprises a first slot and a second slot, wherein said first slot is positioned on one end of said lever and said second slot is positioned on the end of said lever opposite said first slot, wherein said lever acts as a means for interconnecting said airfoil with a second and horizontally opposed airfoil such that said airfoils are constrained to displace in opposite directions with respect to each other, wherein a user can apply tension to either of said cables to raise or lower said central hinge mount with respect to said vertical guide plate, thereby altering the amount said airfoils can displace.

6. The compliant root structure according to claim 1, further comprising a first cable, a second cable, two pulleys, and an extension arm, wherein said extension arm is affixed to one of said connecting arms, wherein said pulleys are affixed to either said airfoil or said fuselage structure, wherein said first cable and said second cable are rigged to wrap around said pulleys so that said first cable and said second cable can attach to a first edge and a second edge of said extension arm respectively, wherein angular displacements of said extension arm results in an increase in tension applied to either said first cable or said second cable, wherein said first cable and said second cable can act as a conventional cable means for controlling an aileron affixed to said airfoil so that any relative displacement of said airfoil with respect to said fuselage structure results in a deflection of said aileron to produce an aerodynamic force in a direction opposite of the displacement of said airfoil.

7. The compliant root structure according to claim 1, wherein said connecting arms having the same axes of rotation with respect to said fuselage structure are interconnected with stiffening members.

8. The compliant root structure according to claim 1 and further comprising:
- an extension arm at the first end of one of said connecting arms, wherein the extension arm extends past the first hinge mount opposite the second end, and wherein the extension arm moves with the one of connecting arms as a function of angular displacement of the one of the connecting arms; and
- an aerodynamic element selected from the group consisting of an aileron, a flap, and combinations thereof, the aerodynamic element carried by the airfoil and operatively connected to the extension arm, wherein aerodynamic force on the aerodynamic element is transmitted to the one of said connecting arms via the extension arm.

9. An assembly for an aircraft, the assembly comprising:
- an airfoil;
- a fuselage structure;
- a compliant root structure connecting the airfoil to the fuselage structure that allows for relative displacement of said airfoil with respect to said fuselage structure in a direction approximately perpendicular to chordwise and spanwise axes of said airfoil as a function of applied displacement loads, the compliant root structure including:
  - a plurality of connecting arms, wherein each of said connecting arms is a rigid longitudinal member comprising a first end and a second end, wherein said first end of each said connecting arm is pivotally affixed to a root of said airfoil by means of a first hinge mount, wherein each of said connecting arms is also pivotally affixed to said fuselage structure by means of a second hinge mount at a distance from said first hinge mount along a length of each of said connection arms; and
  - restoring force means interconnected with said fuselage structure and said connecting arms, wherein said restoring force means provides a restoring force to displacements of said connecting arms from a neutral position with respect to said fuselage structure.

10. An assembly for an aircraft, the assembly comprising:
- an airfoil;
- a fuselage structure;
- a compliant root structure connecting the airfoil to the fuselage structure that allows for relative displacement of said airfoil with respect to said fuselage structure in a direction approximately perpendicular to chordwise and spanwise axes of said airfoil as a function of applied displacement loads, the compliant root structure including:
  - a plurality of connecting arms, wherein each of said connecting arms is a rigid longitudinal member comprising a first end and a second end, wherein said first end of each said connecting arm is pivotally affixed to a root of said airfoil by a first mount, wherein each of said connecting arms is also pivotally affixed to said fuselage structure by a second mount at a distance from said first mount along a length of each of said connection arms; and
  - a spring operatively connected between said fuselage structure and one or more of said connecting arms, wherein said connecting arms each have a neutral position, wherein displacement of the airfoil relative to said fuselage structure causes displacement of the connecting arms connected thereto, wherein displacement of at least one of the connecting arms acts upon the spring, and wherein said spring is configured to provide a restoring force to said at least one connecting arm toward the neutral position from a displaced position.

11. The assembly of claim 10, wherein the spring is a leaf spring.

12. The assembly of claim 10, wherein the spring is a linear shock absorber.

13. The assembly of claim 10, wherein the first mount and the second mount each comprise a hinge mount.

14. The assembly of claim 10, further comprising:
- an additional airfoil;
- an additional compliant root structure connecting the additional airfoil to the fuselage structure, the additional compliant root structure including:
  - a plurality of additional connecting arms each having a first end and a second end, wherein said first end of each said additional connecting arm is pivotally affixed to a root of said additional airfoil and, wherein each of said additional connecting arms is also pivotally affixed to said fuselage structure; and
  - an additional spring operatively connected between said fuselage structure and one or more of said additional connecting arms;
- a lever pivotally mounted to the fuselage structure, wherein the lever is connected to the spring and the additional spring at opposite sides of a fulcrum location of the lever.

15. The assembly of claim 10, wherein the plurality of connecting arms are each arranged substantially parallel to the airfoil in the neutral position.

16. The assembly of claim 10 and further comprising:
- an extension arm at the first end of one of said connecting arms, wherein the extension arm extends past the first mount opposite the second end, and wherein the extension arm moves with the one of connecting arms as a function of displacement of the one of the connecting arms; and
- an aerodynamic element selected from the group consisting of an aileron, a flap, and combinations thereof, the aerodynamic element carried by the airfoil and operatively connected to the extension arm, wherein aerodynamic force on the aerodynamic element is transmitted to the one of said connecting arms via the extension arm.

17. The assembly of claim 16, wherein the aerodynamic element is operatively connected to the extension arm using a cable, and wherein the aerodynamic force on the aerodynamic element is transmitted to the extension arm via the cable.

18. A method of dampening a dynamic response of aircraft components to applied force, the method comprising:
- providing an assembly for an aircraft according to claim 10;
- displacing the airfoil relative to the fuselage structure from a neutral position, wherein at least the root end of the airfoil is displaced at least partly in a direction parallel to a lift vector direction in which the airfoil can generate lift;
- pivoting the plurality of connecting arms relative to both the airfoil and the fuselage structure when the airfoil is displaced relative to the fuselage structure, wherein each of the connecting arms is pivotally secured to the airfoil with the first mount and further pivotally secured to the fuselage structure with the second mount; and
- applying a restoring force to the airfoil to urge the airfoil toward the neutral position, wherein the restoring force is provided by the spring, and wherein the restoring force is transmitted to the airfoil through at least a portion of at least one of the connecting arms.

19. The method of claim 18 and further comprising:

applying a supplemental restoring force to the airfoil, wherein the supplemental restoring force is provided by aerodynamic loading on at least one of a flap or aileron, and wherein the supplemental restoring force is transmitted to the airfoil through at least a portion of at least one of the connecting arms.

20. The method of claim 19, wherein the restoring force and the supplemental restoring force are applied at or near opposite ends of the same one of the connecting arms.

21. The method of claim 18, wherein the plurality of connecting arms are each arranged substantially parallel to the airfoil in a spanwise direction in the neutral position.

* * * * *